US012704809B2

(12) United States Patent
Kadowaki et al.

(10) Patent No.: US 12,704,809 B2
(45) Date of Patent: Aug. 11, 2026

(54) IMAGE FORMING APPARATUS

(71) Applicant: CANON KABUSHIKI KAISHA, Tokyo (JP)

(72) Inventors: Hiroyuki Kadowaki, Kanagawa (JP); Yoji Misao, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/076,679

(22) Filed: Mar. 11, 2025

(65) Prior Publication Data

US 2025/0291306 A1 Sep. 18, 2025

(30) Foreign Application Priority Data

Mar. 13, 2024 (JP) ................................ 2024-039053

(51) Int. Cl.
*G03G 21/16* (2006.01)
*G03G 21/18* (2006.01)

(52) U.S. Cl.
CPC ....... *G03G 21/1671* (2013.01); *G03G 21/168* (2013.01); *G03G 21/185* (2013.01); *G03G 2221/1615* (2013.01)

(58) Field of Classification Search
CPC ........... G03G 21/1619; G03G 21/1623; G03G 21/1633; G03G 21/1661; G03G 21/1671; G03G 21/168; G03G 21/1839; G03G 21/1842; G03G 21/1846; G03G 21/1853; G03G 2221/1642; G03G 2221/1684; G03G 2221/1687; G03G 2221/1846
See application file for complete search history.

(56) References Cited

U.S. PATENT DOCUMENTS

| | | | | |
|---|---|---|---|---|
| 2004/0022556 A1* | 2/2004 | Nomura | G03G 21/1889 399/116 |
| 2006/0140669 A1* | 6/2006 | Sato | G03G 21/1647 399/121 |
| 2007/0059033 A1 | 3/2007 | Kitozaki | |
| 2007/0286649 A1* | 12/2007 | Kawasumi | G03G 21/168 399/296 |

(Continued)

FOREIGN PATENT DOCUMENTS

| | | |
|---|---|---|
| JP | 2001249508 A | 9/2001 |
| JP | 2010244018 A | 10/2010 |

(Continued)

*Primary Examiner* — Thomas S Giampaolo, II
(74) *Attorney, Agent, or Firm* — Canon U.S.A., Inc IP Division

(57) ABSTRACT

An image forming apparatus includes: an apparatus main body; a first unit including a photosensitive drum, the first unit including a first wall surface provided at one end portion in a rotation axis direction of the photosensitive drum; and a second unit including a belt capable of coming into contact with the photosensitive drum. The first unit and the second unit are capable of being coupled to each other and moving integrally to the outside of the apparatus main body. In a state in which the first unit and the second unit are coupled to each other, the first wall surface is located outward of the belt in the rotation axis direction, and a lower end portion of the first wall surface in a vertical direction is located below a contact surface of the belt that comes into contact with the photosensitive drum.

11 Claims, 19 Drawing Sheets

(56) References Cited

U.S. PATENT DOCUMENTS

| | | | | |
|---|---|---|---|---|
| 2010/0239271 A1* | 9/2010 | Kawamura | ............. | B65H 7/06<br>399/21 |
| 2017/0123351 A1 | 5/2017 | Mizuno | | |

FOREIGN PATENT DOCUMENTS

| | | |
|---|---|---|
| JP | 2012103485 A | 5/2012 |
| JP | 2015206897 A | 11/2015 |

* cited by examiner

IMAGE FORMING APPARATUS

BACKGROUND

Field

The present disclosure relates to an image forming apparatus that forms an image on a recording material.

Description of the Related Art

Some image forming apparatuses, such as printers, copiers, and multifunction devices, have cartridges that are removably attached to a tray, which moves between the inside and outside of the main body of the apparatus.

Japanese Patent Application Publication No. 2010-244018 discloses an image forming apparatus including a tray, to which cartridges are removably attached, and a fixing apparatus. The tray is movable to the outside of the apparatus main body of the image forming apparatus through multiple openings.

Furthermore, Japanese Patent Application Publication No. 2015-206897 discloses an image forming apparatus including a tray, to which cartridges are removably attached, a transfer unit, and a fixing apparatus. In Japanese Patent Application Publication No. 2015-206897, the tray and the transfer unit are movable from the inside to the outside of the image forming apparatus. Specifically, the fixing apparatus is placed at one end side of the apparatus main body of the image forming apparatus, and when the transfer unit moves to the outside of the apparatus main body, the transfer unit moves in a direction from the other end side to the one end side of the apparatus main body. In contrast, when the tray moves to the outside of the apparatus main body, the tray moves in a direction from one end side to the other end side of the apparatus main body.

SUMMARY

The present disclosure improves over conventional technology, and includes features to limit the occurrence of image defects caused by intrusion of foreign matter in an image forming apparatus in which a cartridge unit and a transfer unit are removable from the main body of the apparatus.

According to some embodiments, an image forming apparatus according to the present disclosure includes features characterized as: an apparatus main body; a first unit including a photosensitive drum, the first unit being movable between an inside and an outside of the apparatus main body and including a first wall surface provided at one end portion in a rotation axis direction of the photosensitive drum; and a second unit including a belt configured to contact with the photosensitive drum, the second unit being movable between the inside and the outside of the apparatus main body while the first unit is inside the apparatus main body, wherein the first unit and the second unit are movable to the outside of the apparatus main body in a state in which the first unit and the second unit are coupled to each other, and wherein in the state in which the first unit and the second unit are coupled to each other, the first wall surface is located outward of the belt in the rotation axis direction, and a lower end portion of the first wall surface in a vertical direction is located below a contact surface of the belt that comes into contact with the photosensitive drum.

According to the present disclosure, it is possible to further develop the conventional technology, and to limit the occurrence of image defects caused by intrusion of foreign matter.

Further features of the present disclosure will become apparent from the following description of exemplary embodiments with reference to the attached drawings.

DESCRIPTION OF THE EMBODIMENTS

Figure 1:
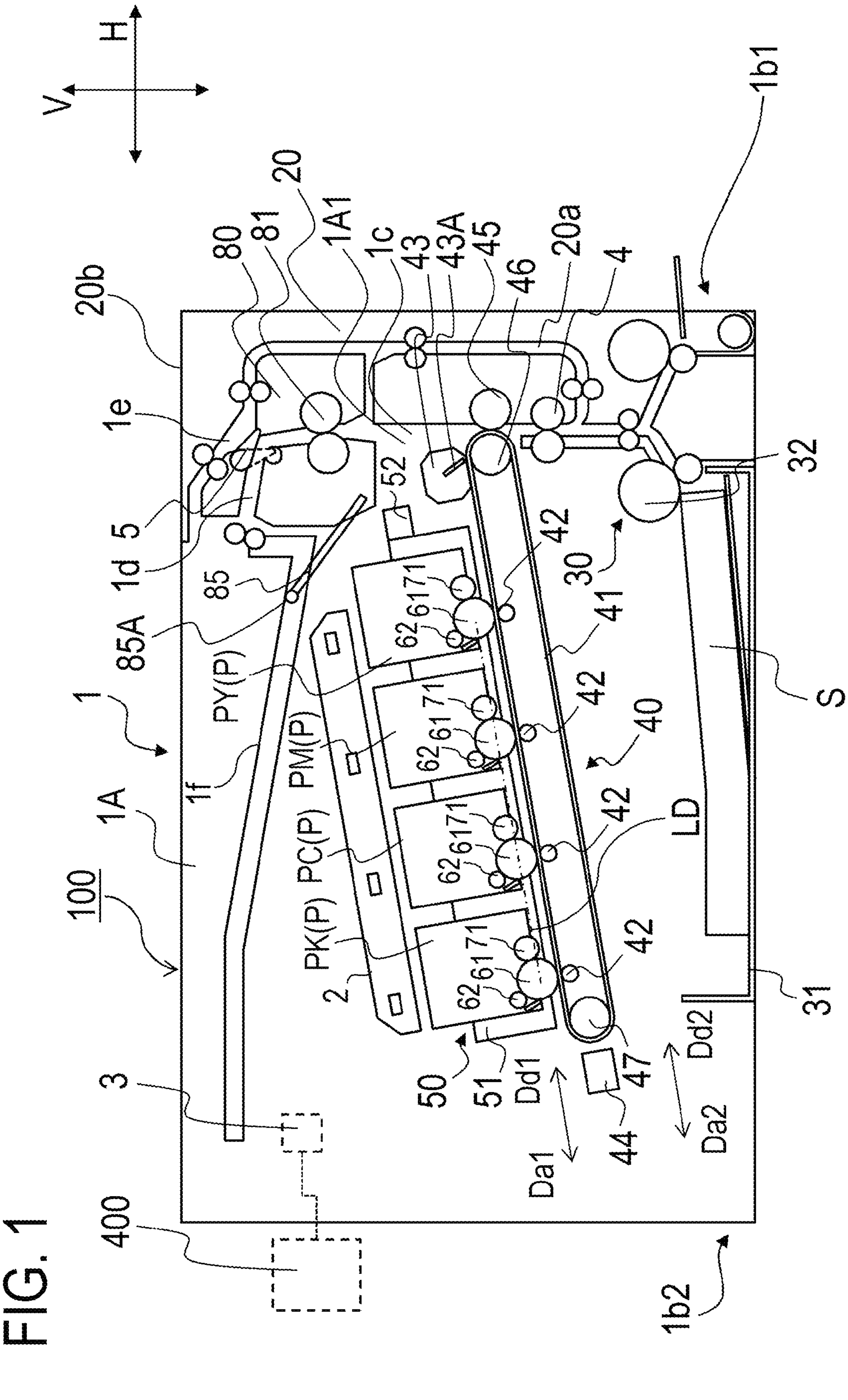
FIG. 1 is a diagram illustrating the overall configuration of a printer.

Referring to the drawings, exemplary modes for carrying out the present disclosure will be described in detail based on embodiments. The dimensions, materials, shapes, and relative arrangements of the components described in the embodiments may be modified as appropriate according to the configuration of the apparatus to which the disclosure is applied and various conditions. Also, not all combinations of features described in the present embodiments are essential for the solution means of the present disclosure. Components described in the embodiments are merely examples, and are not intended to limit the scope of the present disclosure only to the components.

First Embodiment

Overall Configuration

FIG. 1 is a diagram illustrating the overall configuration of a printer 1 according to the present embodiment. The printer 1 serving as an image forming apparatus is described with reference to FIG. 1. In this embodiment, the printer 1 is an electrophotographic color laser beam printer, which forms an image on a sheet S as a recording material.

The printer 1 includes an apparatus main body 1A, a scanner 2, a control portion 3, and a door 20, which can be opened and closed with respect to the apparatus main body 1A. The printer 1 also includes a sheet feeding portion 30, a transfer unit 40 serving as a transfer apparatus, a tray unit 50 serving as a drawer unit, and a fixing apparatus 80. The section including the apparatus main body 1A and the door 20 may be referred to as a main frame 100. The main frame 100 includes an exterior portion of the printer 1.

The apparatus main body 1A houses the scanner 2, the control portion 3, the sheet feeding portion 30, the transfer unit 40, the tray unit 50, and the fixing apparatus 80.

The sheet feeding portion 30 includes a stacking tray 31 for stacking sheets S, and a supply roller 32. The stacking tray 31 can be pulled in the direction of the door 20 to allow sheets S to be replenished.

The tray unit 50 as a first unit includes a tray 51, which serves as a support member, and cartridges PY, PM, PC, and PK. The tray 51 includes a tray handle 52. The cartridges PY, PM, PC, and PK are removably attached to the tray 51.

Each of the cartridges PY, PM, PC, and PK is attachable to and detachable from the tray 51 independently of the others. The cartridges PY, PM, PC, and PK contain yellow (Y), magenta (M), cyan (C), and black (K) toners (developers), respectively. The cartridges PY, PM, PC, and PK have the same configuration except that they contain different colors of toner. Thus, the configuration and operation of one of the cartridges PY, PM, PC, and PK will be described, and descriptions of the others may be omitted. Also, to simplify distinguishing between cartridges PY, PM, PC, and PK, the cartridges PY, PM, PC, and PK may be simply referred to as cartridge P. It may be understood that the tray unit 50 includes multiple cartridges P and the tray 51 to which these cartridges P are removably attached.

In this embodiment, the tray unit 50 includes multiple photosensitive drums (image bearing members) 61, multiple charging rollers 62 (charging members), and multiple developing rollers (developer bearing members) 71. Specifically, the tray unit 50 includes four photosensitive drums 61, four charging rollers 62, and four developing rollers 71. The rotation axis direction of the photosensitive drums 61, the rotation axis direction of the developing rollers 71, and the rotation axis direction of the charging rollers 62 are parallel to each other.

The section for forming a black (K) image is referred to as a black station (first station). The photosensitive drum 61 of the first station is referred to as a first photosensitive drum, the developing roller 71 as a first developing roller, and the charging roller 62 as a first charging roller.

The section for forming a cyan (C) image is referred to as a cyan station (second station). The photosensitive drum 61 of the second station is referred to as a second photosensitive drum, the developing roller 71 as a second developing roller, and the charging roller 62 as a second charging roller.

The section for forming a magenta (M) image is referred to as a magenta station (third station). The photosensitive drum 61 of the third station is referred to as a third photosensitive drum, the developing roller 71 as a third developing roller, and the charging roller 62 as a third charging roller.

The section for forming a yellow (Y) image is referred to as a yellow station (fourth station). The photosensitive drum 61 of the fourth station is referred to as a fourth photosensitive drum, the developing roller 71 as a fourth developing roller, and the charging roller 62 as a fourth charging roller.

The cartridge PK is attached to the black station, the cartridge PC is attached to the cyan station, the cartridge PM is attached to the magenta station, and the cartridge PY is attached to the yellow station. In this embodiment, the cartridge PK is referred to as the first cartridge, the cartridge PC as the second cartridge, the cartridge PM as the third cartridge, and the cartridge PY as the fourth cartridge. It should be noted that the numbers such as first, second, third, and fourth are used for convenience of description.

The photosensitive drums 61, the charging rollers 62, and the developing rollers 71 may be disposed in either the cartridges P or the tray 51. In this embodiment, the cartridges P include the photosensitive drums 61, the charging rollers 62, and the developing rollers 71.

The transfer unit 40 as a second unit includes a belt 41, primary transfer rollers 42, a cleaning portion 43, a driver roller 46 as a first roller that drives the belt 41, and a tension roller (driven roller) 47 as a second roller. The printer 1 of the present embodiment has an optical sensor 44 for detecting the toner image transferred onto the belt 41. In this embodiment, the belt 41 is located below the photosensitive drums 61 and can come into contact with the photosensitive drums 61 so as to form a primary transfer portion between the belt 41 and the photosensitive drums 61. Multiple primary transfer rollers 42 are provided at positions opposed to the respective photosensitive drums 61 with the belt 41 interposed therebetween. The printer 1 also includes a secondary transfer roller 45, which is in contact with the belt 41 so as to form a secondary transfer portion. The secondary transfer portion is formed between the belt 41 and the secondary transfer roller 45. The rotation axis direction of the primary transfer rollers 42, the rotation axis direction of the driver roller 46, the rotation axis direction of the tension roller 47, and the rotation axis direction of the secondary transfer roller 45 are parallel to each other. A pair of registration rollers 4 is placed upstream of the secondary transfer portion.

The fixing apparatus 80 includes a fixing portion 81 and a flapper 5. When an image forming operation is performed on a sheet S, the fixing apparatus 80 is at a use position. While housed within (inside) the apparatus main body 1A, the fixing apparatus 80 is at the use position. Also, the fixing apparatus 80 is also configured to heat the sheet S at the use position. In this embodiment, the fixing portion 81 includes a heating portion (heating roller) including a heater, and a pressure portion (pressure roller).

Figure 2:
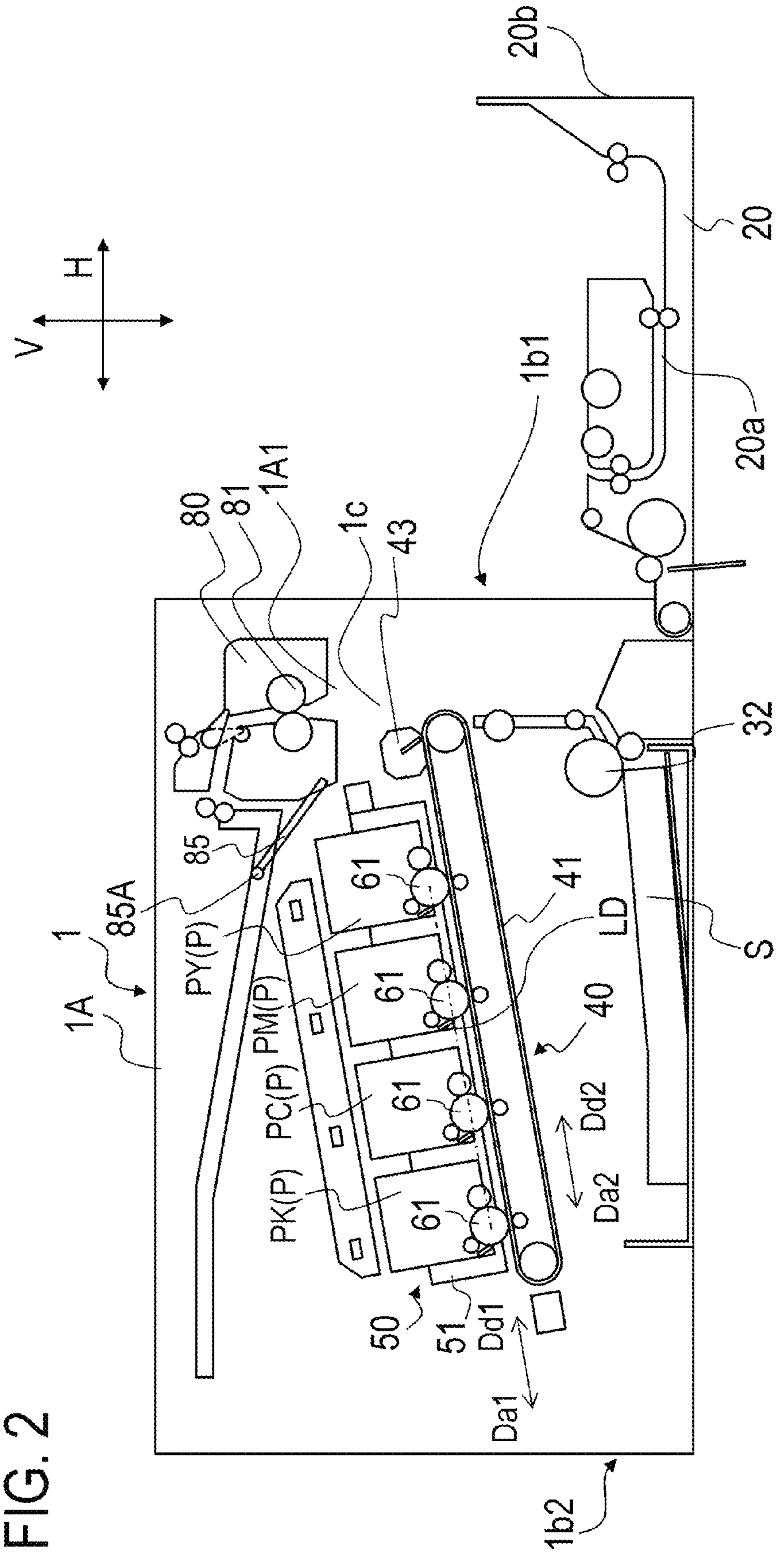
FIG. 2 is a diagram illustrating the printer with the door open.
Figure 3:
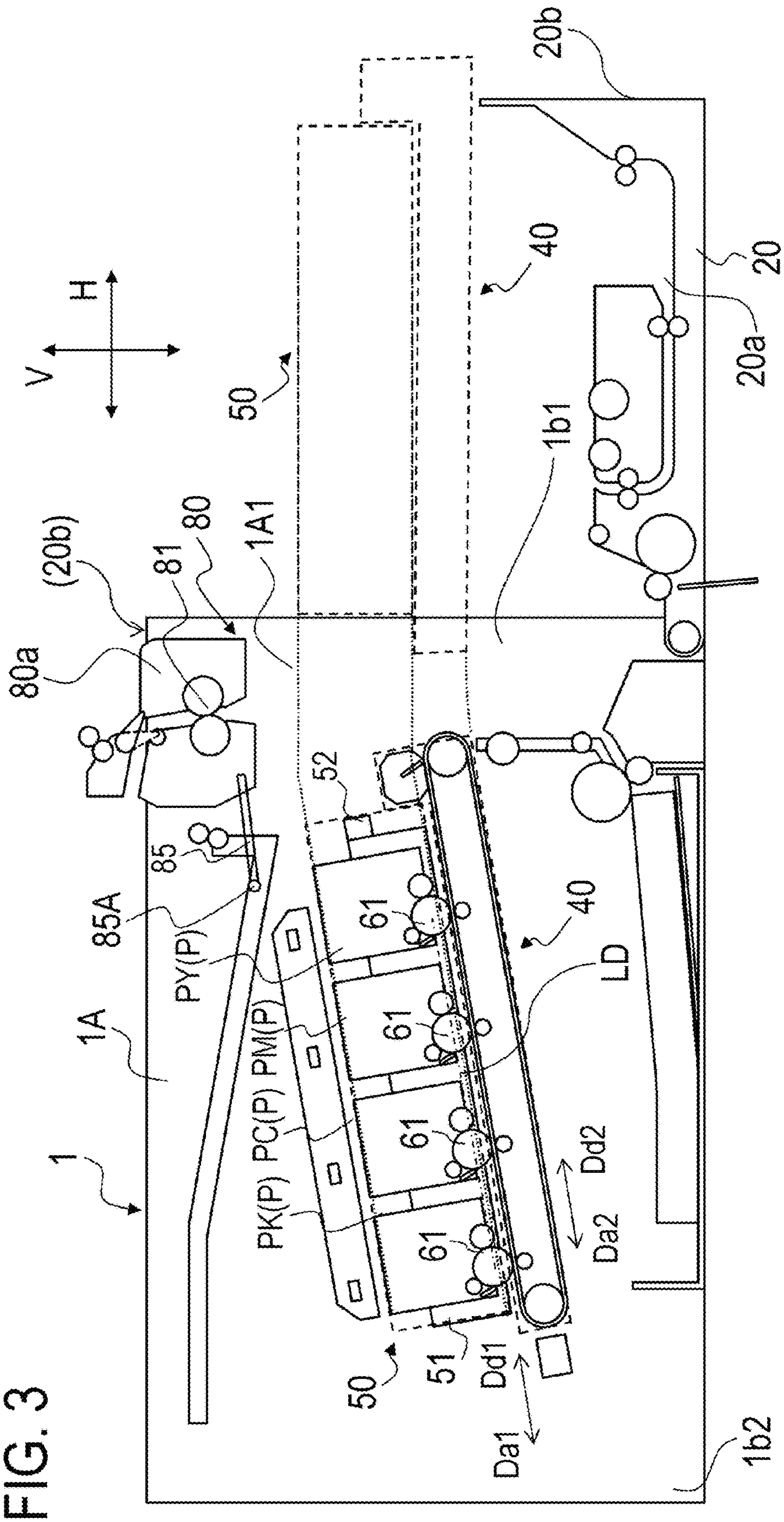
FIG. 3 is a diagram illustrating the printer in a state in which a fixing apparatus is moved.
Figure 4:
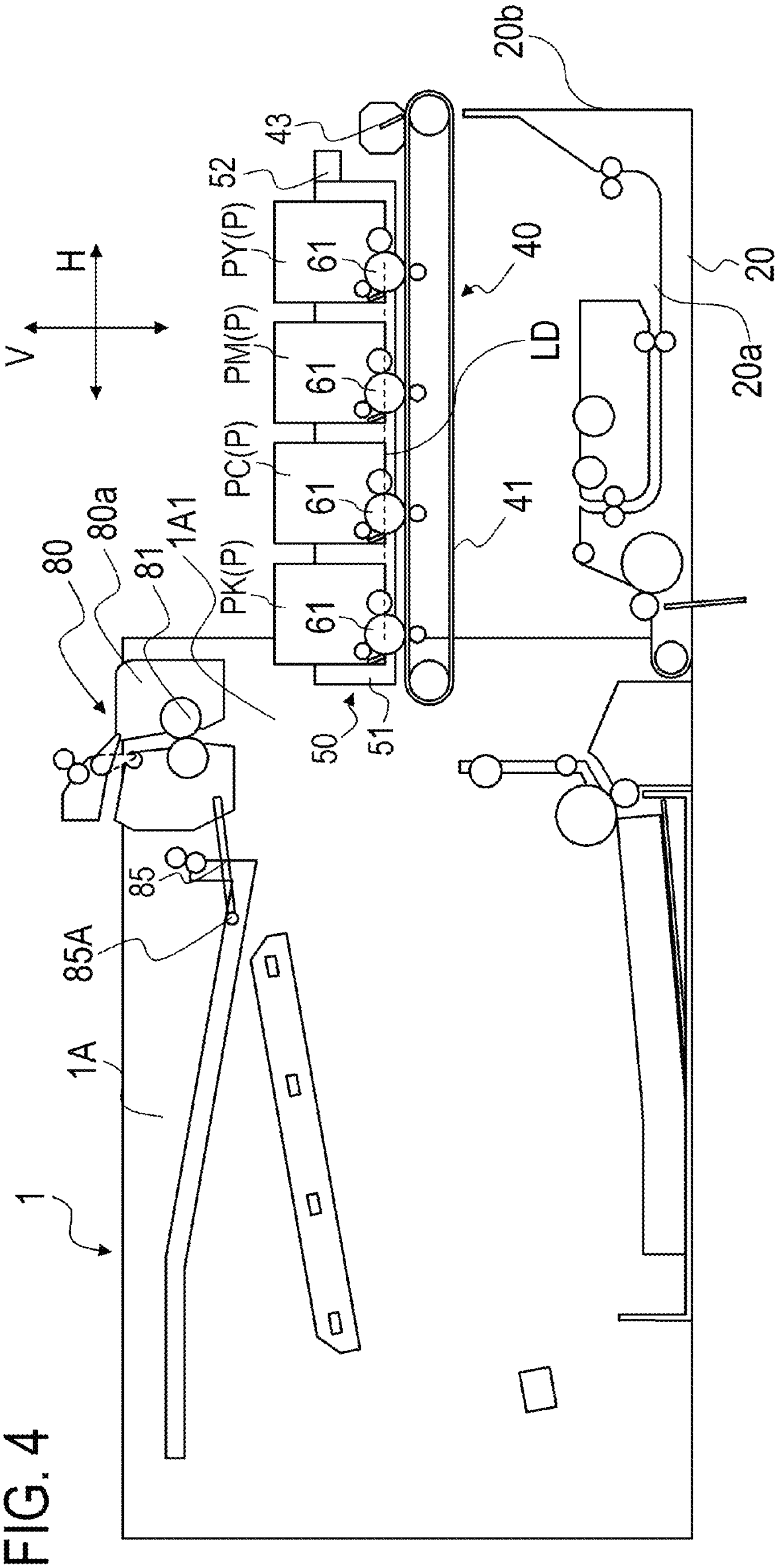
FIG. 4 is a diagram illustrating the printer in a state in which a transfer unit and a tray unit are pulled out.
Figure 5:
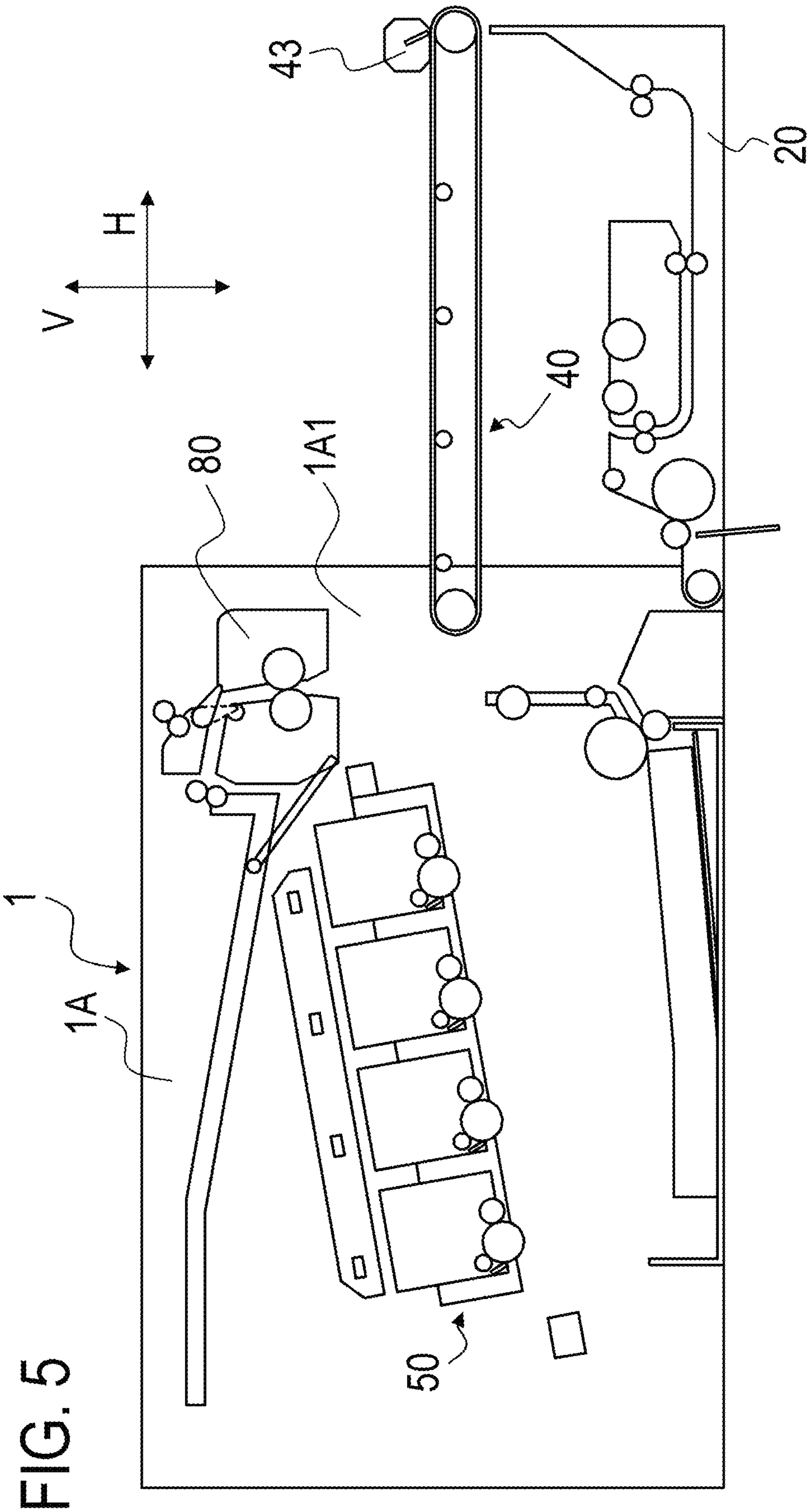
FIG. 5 is a diagram illustrating the printer in a state in which the transfer unit is pulled out alone.

Referring to FIGS. 1 to 5, the movements of the transfer unit 40 and the tray unit 50 are now described. FIG. 2 is a diagram illustrating the printer 1 with the door 20 open. FIG. 3 is a diagram illustrating the printer 1 in a state in which the fixing apparatus 80 is moved. FIG. 4 is a diagram illustrating the printer 1 in a state in the transfer unit 40 and the tray unit 50 are pulled out. FIG. 5 is a diagram illustrating the printer 1 in a state in which the transfer unit 40 alone is pulled out.

The transfer unit 40 and the tray unit 50 are movable from the inside to the outside of the apparatus main body 1A. In a horizontal direction H, the apparatus main body 1A has a first end portion **1*b*1, which includes an opening 1A1, and a second end portion 1*b*2 opposite to the first end portion 1*b*1. The tray unit 50 is movable through the opening 1A1 to a first inside position inside the apparatus main body 1A and to a first outside position outside the apparatus main body 1A. The transfer unit 40 is movable through the opening 1A1 to a second inside position inside the apparatus main body 1A and to a second outside position outside the apparatus main body 1A. The opening 1A1 may include an opening through which the tray unit 50 passes and an opening through which the transfer unit 40 passes. When the transfer unit 40 moves from the second inside position to the second outside position, at least the belt 41 is moved, and at least a part of the belt 41 protrudes from the apparatus main body 1A toward the outside of the apparatus main body 1A**.

The direction in which the tray unit 50 moves from the first inside position to the first outside position is referred to as a tray removal direction Dd1 (first removal direction), and the direction opposite to the tray removal direction Dd1 is referred to as a tray attachment direction Da1 (first attachment direction). The tray removal direction Dd1 may be understood as the direction from the second end portion **1*b*2 toward the first end portion 1*b*1**.

The direction in which the transfer unit 40 moves from the second inside position to the second outside position is referred to as a transfer removal direction Dd2 (second removal direction), and the direction opposite to the transfer removal direction Dd2 is referred to as a transfer attachment direction Da2 (second attachment direction). The transfer removal direction Dd2 may be understood as the direction from the second end portion **1*b*2 toward the first end portion 1*b*1**.

The tray removal direction Dd1 and the tray attachment direction Da1 are directions intersecting (preferably perpendicular to) the rotation axis direction of the photosensitive drums 61. The transfer removal direction Dd2 and the transfer attachment direction Da2 are directions intersecting (preferably perpendicular to) the rotation axis direction of the driver roller 46. The rotation axis direction of the driver roller 46 is parallel to the rotation axis direction of the photosensitive drums 61.

In the horizontal direction H, the fixing apparatus 80 is placed on one end side of the apparatus main body 1A (the side where the first end portion **1*b*1** is located).

The door 20 attached to the apparatus main body 1A is movable between a closed position and an open position. As shown in FIG. 1, when the door 20 is in the closed position (closed state of the door 20), the door 20 covers the opening 1A1. As shown in FIG. 2, when the door 20 is in the open position (open state of the door 20), the opening 1A1 is exposed.

As shown in FIG. 1, when the door 20 is in the closed position, the door 20 covers the fixing apparatus 80 attached to the apparatus main body 1A. More specifically, when the door 20 is in the closed position, an upper cover portion **20*b* of the door 20 is located above the fixing apparatus 80. The upper cover portion 20*b* of the door 20** functions as a part of the exterior portion.

The door 20 is movable between the open position and the closed position with the fixing apparatus 80 supported by the apparatus main body 1A. In other words, the door 20 moves from the closed position to the open position so as to move away from the fixing apparatus supported by the apparatus main body 1A. As such, as shown in FIG. 2, when the door 20 is in the open position, the door 20 is separated from the fixing apparatus 80 supported by the apparatus main body 1A.

As will be described below, the fixing apparatus 80 is movable from the state shown in FIG. 2 to the state shown in FIG. 3 so that the opening 1A1 is widely exposed. With the door 20 and the fixing apparatus 80 moved (FIG. 3), the transfer unit 40 and the tray unit 50 can move from the inside to the outside of the apparatus main body 1A through the opening 1A1, and are brought into the state of FIG. 4 after moving.

With the tray unit 50 moved to the outside of the apparatus main body 1A (FIG. 4), it is permitted to remove the cartridges PY, PM, PC, and PK from the tray 51 and to attach the cartridges PY, PM, PC, and PK to the tray 51. This allows the cartridges PY, PM, PC, and PK to be replaced with new cartridges PY, PM, PC, and PK. In this embodiment, the cartridges P are attachable to and detachable from the tray 51 in a direction intersecting (preferably a direction perpendicular to) the rotation axes of the photosensitive drums 61.

The cartridges PY, PM, PC, and PK may be removed from the tray 51 by moving in a direction away from the transfer unit 40 relative to the tray 51. In other words, the cartridges PY, PM, PC, and PK are moved toward the opposite side of the tray 51 from the transfer unit 40 to be removed from the tray 51. In this embodiment, the transfer unit 40 is placed below the tray unit 50. Accordingly, the cartridges PY, PM, PC, and PK are moved upward relative to the tray 51 to be removed from the tray 51.

Also, the transfer unit 40 can be removed from the apparatus main body 1A independently of the tray unit 50, and can be replaced with a new transfer unit 40.

Image Forming Operation

Referring to FIG. 1, the image forming operation of the printer 1 is now described. The control portion 3 of the printer 1 starts an image forming operation on the sheet S on the basis of an image signal received from an external host apparatus 400. The external host apparatus 400 may be a personal computer, an image reader, and a facsimile machine, for example.

When an image is formed on the sheet S, the fixing apparatus 80 is located at the use position, the tray unit 50 is located at the first inside position, the transfer unit 40 is located at the second inside position, and the door 20 is located at the closed position. When the transfer unit 40 is at the second inside position, the belt 41 can come into contact with the photosensitive drums 61. At this time, the tray unit 50 is located above the transfer unit 40.

A charging voltage is applied to the charging rollers 62, and the photosensitive drums 61 rotate. A laser corresponding to image information is applied to each photosensitive drum 61 from the scanner 2, and the surface of the photosensitive drum 61 charged by the charging roller 62 is exposed to light. This forms an electrostatic latent image corresponding to the image information on the surface of the photosensitive drum 61.

Each developing roller 71 bears toner. A developing voltage is applied to the developing roller 71, and the electrostatic latent image formed on the photosensitive drum 61 is developed with the toner supplied from the developing roller 71, forming a toner image on the surface of the photosensitive drum 61. In this embodiment, the developing roller 71 develops the electrostatic latent image while in contact with the photosensitive drum 61, but the developing roller 71 may develop the electrostatic latent image while there is a gap between the developing roller 71 and the photosensitive drum 61.

When a full-color image is formed, a toner image of each color is formed on each photosensitive drum 61.

In this embodiment, when the tray unit 50 is at the first inside position, each developing roller 71 is movable between a contact position where it is in contact with the corresponding photosensitive drum 61 and a separated position where it is separated from the photosensitive drum 61. Specifically, a switching device provided in the apparatus main body 1A switches between a state in which the developing roller 71 is at the contact position and a state in which the developing roller 71 is at the separated position. This allows the developing roller 71 to be separated from the photosensitive drum 61 while an image forming operation is not performed.

Additionally, the printer 1 can perform monochrome printing in a state in which the developing roller 71 corresponding to the cartridge PK is in contact with the photosensitive drum 61, and the developing rollers 71 corresponding to the cartridges PY, PM, and PC are separated from the photosensitive drums 61. Furthermore, the printer 1 can perform full-color printing in a state in which the belt 41 is in contact with the photosensitive drums 61 corresponding to the cartridges PY, PM, PC, and PK.

The toner images formed on the respective photosensitive drums 61 are transferred onto the belt 41 by the primary transfer rollers 42 in the primary transfer portion, and are conveyed toward the secondary transfer portion, which is formed by the belt 41 and the secondary transfer roller 45.

On the other hand, in the apparatus main body 1A, a conveyance path (first route, first conveyance path) 1*c* is formed through which the sheet S heading toward the fixing apparatus 80 passes. Also, in the door 20, a double-sided conveyance path (second route, second conveyance path) 20*a* is formed through which the sheet S that has passed through the fixing apparatus 80 passes. The door 20 covers the conveyance path 1*c* in the closed state. When the door 20 is opened, the conveyance path 1*c* and the double-sided conveyance path 20*a* are exposed (FIG. 2).

In the sheet feeding portion 30, one sheet S is separated and fed from the sheets S stacked on the stacking tray 31 by the supply roller 32 at a predetermined timing, and is conveyed through the conveyance path 1*c* toward the secondary transfer portion and the fixing apparatus 80.

In the secondary transfer portion, the toner image is transferred from the belt 41 to the sheet S. The toner that is not transferred to the sheet S is removed from the belt 41 by a cleaning blade (cleaning member) 43A, which is provided in the cleaning portion 43.

The sheet S to which the toner image is transferred at the secondary transfer portion is conveyed toward the fixing apparatus 80. In the fixing apparatus 80, the fixing portion 81 heats and pressurizes the sheet S, thereby fixing the toner image to the sheet S. The sheet S with the fixed toner image is conveyed toward the flapper 5 serving as a path switching portion.

The flapper 5 is movable between a discharge position for guiding the sheet S that has passed through the fixing apparatus 80 toward a discharge path 1*d*, and a reversing position for guiding the sheet S toward a reversing path 1*e*.

When single-sided printing is performed in which an image is formed on one side of the sheet S, the sheet S is guided to the discharge path 1*d* by the flapper 5 and discharged onto a discharge tray 1*f* formed in the upper portion of the apparatus main body 1A.

When double-sided printing is performed in which images are printed on both sides of the sheet S, the sheet S is guided by the flapper 5 to the reversing path 1*e*. After the sheet S is guided to the reversing path 1*e*, the conveying direction of the sheet S is reversed, and the sheet S passes through the double-sided conveyance path 20*a* formed in the door 20 and is conveyed toward the secondary transfer portion. After the toner image is transferred onto the back side of the sheet S at the secondary transfer portion, the sheet S passes through the fixing apparatus 80, is guided by the flapper 5 to the discharge path 1*d*, and is discharged onto the discharge tray 1*f* of the apparatus main body 1A.

Removal of Tray Unit and Transfer Unit and Arrangement of Fixing Apparatus

Referring to FIGS. 1 to 5, the removal of the tray unit 50 and the transfer unit 40 from the apparatus main body 1A and the arrangement of the fixing apparatus 80 are described.

As described above, the fixing apparatus 80 of the printer 1 is placed at one end side of the apparatus main body 1A in the horizontal direction H. Also, the transfer unit 40 and the tray unit 50 move from one end side of the apparatus main body 1A to the outside of the apparatus main body 1A through the opening 1A1.

In other words, in the horizontal direction H, the fixing apparatus 80 is closer to the first end portion 1*b*1 than to the second end portion 1*b*2. That is, in the horizontal direction H, the distance between the fixing apparatus 80 and the first end portion 1*b*1 is shorter than the distance between the fixing apparatus 80 and the second end portion 1*b*2. The fixing apparatus 80 is positioned closer to the first end portion 1*b*1 than the center of the apparatus main body 1A in the horizontal direction H, and it may be understood that the distance between the first end portion 1*b*1 and the fixing apparatus 80 in the horizontal direction H is shorter than the distance between the first end portion 1*b*1 and the center of the apparatus main body 1A.

Additionally, as described above, when the tray unit 50 moves from the first inside position to the first outside position, the moving direction of the tray unit 50 is a direction intersecting the rotation axes of the photosensitive drums 61. At this time, the tray unit 50 moves away from the second end portion 1*b*2.

As described above, when the transfer unit 40 moves from the second inside position to the second outside position, the moving direction of the transfer unit 40 is a direction intersecting the rotation axis of the driver roller 46. At this time, the transfer unit 40 moves away from the second end portion 1*b*2.

As described above, the door 20 of this embodiment covers the opening 1A1 in the closed state, and also covers at least a part of the conveyance path 1*c* for the sheet S. Also, the door 20 includes the double-sided conveyance path 20*a*. In the event of a jam of a sheet S (hereinafter referred to as a jam), the user of the printer 1 can remove the sheet S from one end side of the apparatus main body 1A to clear the jam. Specifically, the user can remove the sheet S by moving the door 20 to the open position and accessing the inside of the apparatus main body 1A. Also, when a part of the sheet S that has passed through the fixing apparatus 80 is exposed to the outside of the apparatus main body 1A, the sheet S can be removed by pulling it from the outside of the apparatus main body 1A without opening the door 20.

Furthermore, the user of the printer 1 can move the transfer unit 40 and the tray unit 50 to the outside of the apparatus main body 1A from one end side of the apparatus main body 1A, and perform tasks such as checking the status of the transfer unit 40 and the cartridges P, maintenance, and replacement.

That is, in the printer 1, in which the fixing apparatus 80 is placed at one end side of the apparatus main body 1A, the transfer unit 40 and the tray unit 50 are movable in and out of the apparatus main body 1A through that one end side of the apparatus main body 1A. As a result, the user can clear a jam, access the fixing apparatus 80, and operate the transfer unit 40 and the tray unit 50 from one direction.

In this embodiment, the side of the printer 1 including the door 20 is defined as the front side. As such, it is sufficient that a space is provided for performing tasks, such as clearing jams and operating the transfer unit 40 and the tray unit 50, from the front side of the printer 1. On the other hand, there is no need to secure space to perform such tasks from the left, right, back, or top of the printer 1. This allows the printer 1 to be installed in a smaller space.

If the transfer unit 40 or the tray unit 50 is pulled out from the other end side of the apparatus main body 1A, the user needs to access both end sides of the apparatus main body 1A to clear a jam and pull out the transfer unit 40 or the tray unit 50. Also, if one of the transfer unit 40 and the tray unit 50 is pulled out from one end side of the apparatus main body 1A and the other of the transfer unit 40 and the tray unit 50 is pulled out from the other end side, the user needs to access both end sides of the apparatus main body 1A. This may use a space for performing tasks from not only the front side but also from the rear side of the apparatus main body 1A, increasing the area used for installing the printer 1. However, with the present embodiment, the transfer unit 40 and the tray unit 50 are operated from the front side (the side corresponding to the door 20) of the apparatus main body 1A as described above, so that the printer 1 can be installed in a smaller space.

Furthermore, with this embodiment, the sheets S can be replenished from one end side of the apparatus main body 1A. As such, it may be desirable to secure a space for replenishing the sheets S from the front side of the printer 1, allowing the printer 1 to be installed in a smaller space.

Relationship Between Tray Unit and Fixing Apparatus

Figure 6:
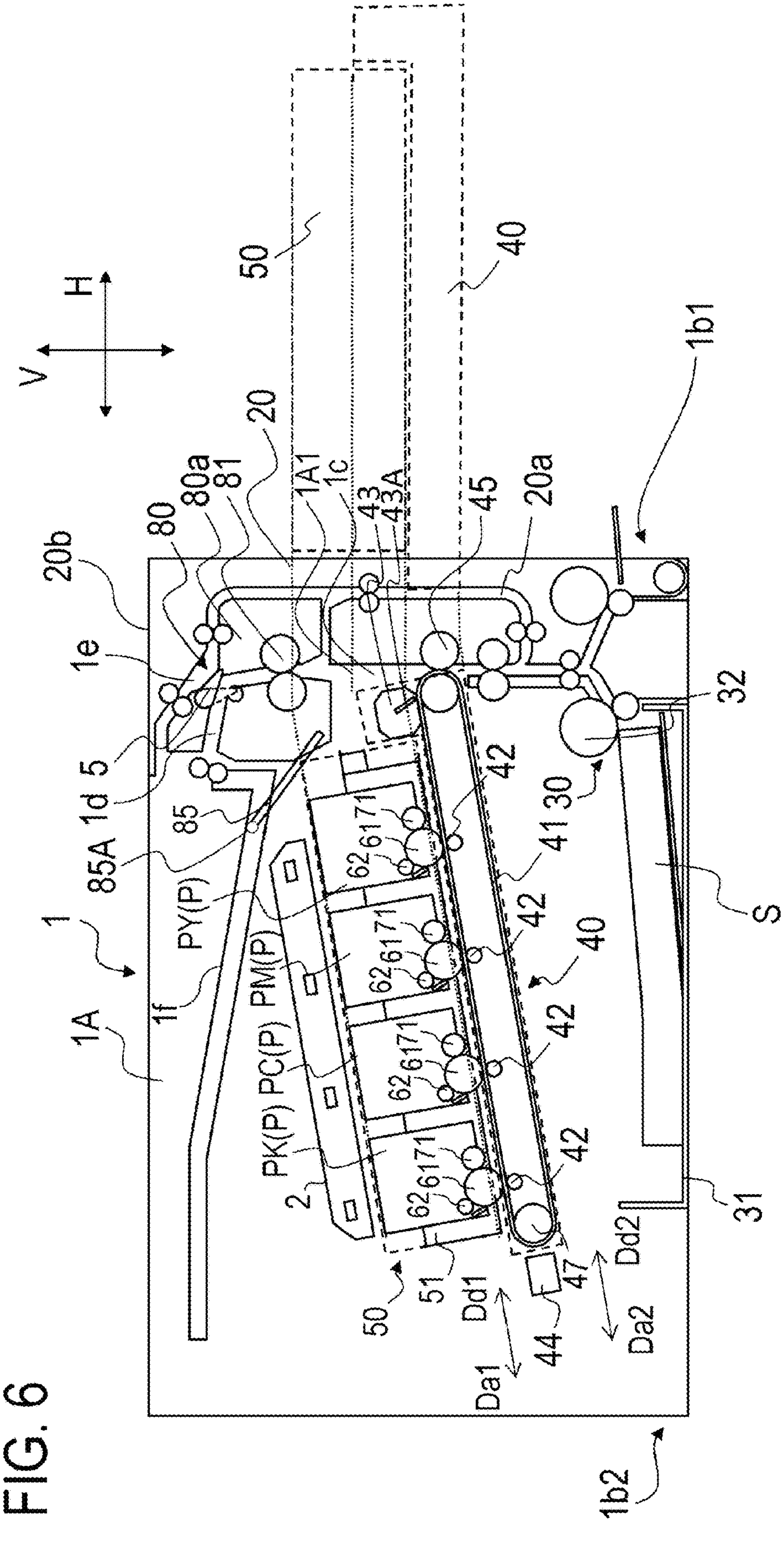
FIG. 6 is a diagram for illustrating the movement of the transfer unit and the tray unit.
Figure 7:
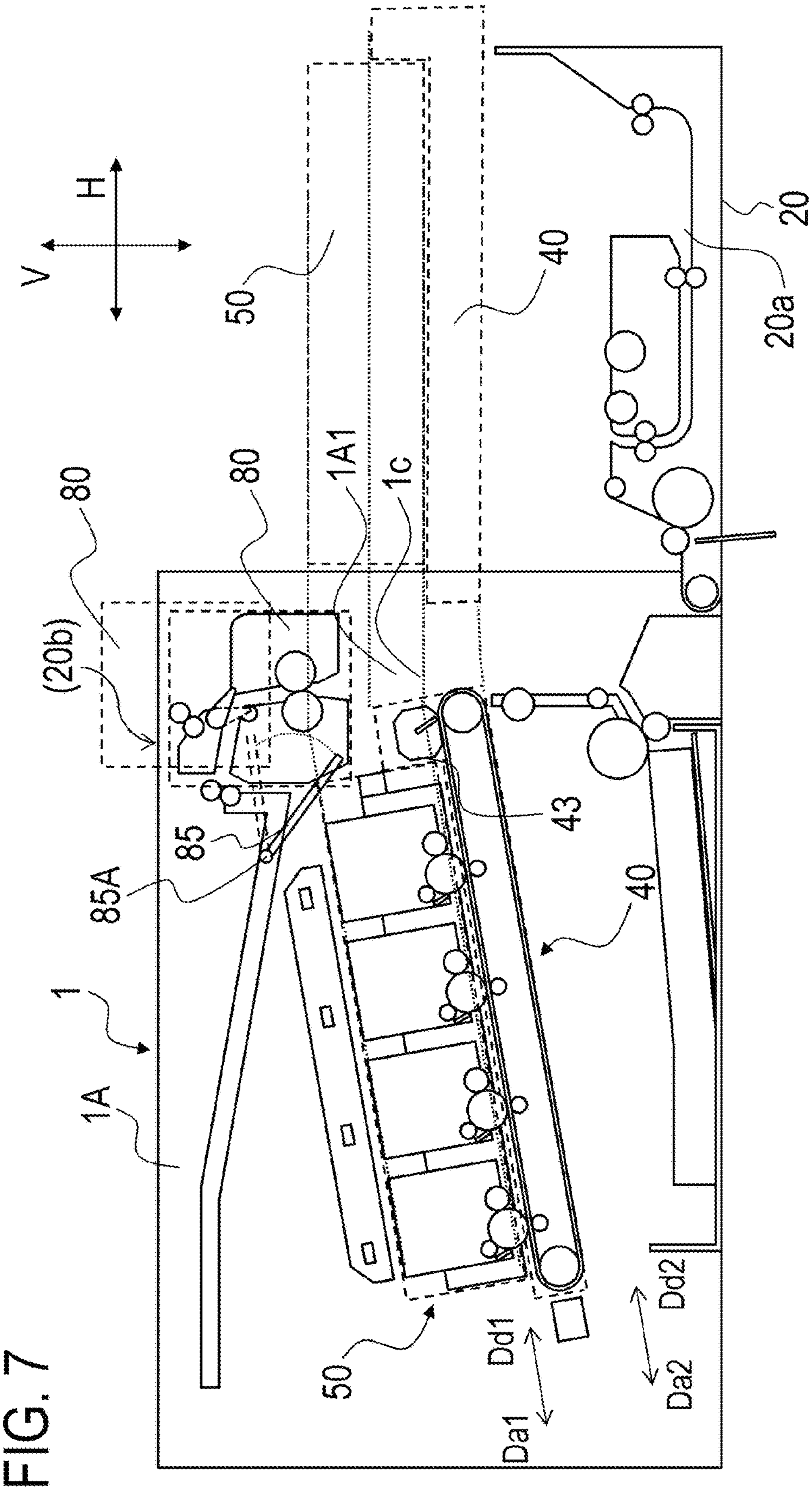
FIG. 7 is a diagram for illustrating the movement of the transfer unit and the tray unit.

Referring to FIGS. 1 to 4, 6, and 7, the relationship between the tray unit 50 and the fixing apparatus 80 is described. FIGS. 6 and 7 are diagrams for illustrating the movement of the transfer unit 40 and the tray unit 50.

The tray unit 50 passes through a predetermined space when moving between the first inside position where an image forming operation on the sheet S is performed and the first outside position where replacement of the cartridges P is permitted. The space through which the tray unit 50 passes when moving from the first inside position to the first outside position in this manner is referred to as a first space (movement space of the tray unit 50). The first space may also be referred to as a path or a trajectory through which the tray unit 50 passes when moving from the first inside position to the first outside position (first movement path, first movement trajectory).

The transfer unit 40 passes through a predetermined space when moving between the second inside position where an image forming operation on the sheet S is performed and the second outside position. The space through which the transfer unit 40 passes when moving from the second inside position to the second outside position is referred to as a second space (movement space of the transfer unit 40). The second space may also be referred to as a path or a trajectory through which the transfer unit 40 passes when moving from the second inside position to the second outside position (second movement path, second movement trajectory).

The position (use position) of the fixing apparatus 80 for performing an image forming operation on the sheet S has the following relationship with the first and second spaces.

That is, as shown in FIGS. 6 and 7, at least a part of the fixing apparatus 80 at the use position overlaps with the first space. In other words, when the fixing apparatus 80 is at the use position, at least a part of the fixing apparatus 80 is inside the first space.

In this embodiment, at least a part of the fixing apparatus 80 overlaps with the space through which the cartridges P pass when the tray unit 50 moves from the first inside position to the first outside position, but it may also be positioned so as to overlap with the space through which the tray 51 passes.

This allows the apparatus main body 1A to be smaller in size than in a configuration in which the fixing apparatus 80 at the use position is located outside the first space.

As shown in FIG. 6, in this embodiment, when the door 20 is in the closed state, at least a part of the double-sided conveyance path 20*a* overlaps with the first space. That is, when the door 20 is in the closed state, at least a part of the double-sided conveyance path 20*a* is inside the first space.

As described above, at least a part of the fixing apparatus 80 at the use position is inside the first space. Thus, when the fixing apparatus 80 is at the use position, the tray unit 50 is restricted from moving from the first inside position to the first outside position. On the other hand, the fixing apparatus 80 is configured to be retractable from the use position. When the fixing apparatus 80 is retracted from the use position, the tray unit 50 is permitted to move from the first inside position to the first outside position. When the tray unit 50 moves from the first inside position to the first outside position, the tray unit 50 passes below the fixing apparatus 80. The fixing apparatus 80 is located outside the second space when at the use position and at the retracted position. As such, in both the state in which the fixing apparatus 80 is at the use position and the state in which the fixing apparatus 80 is at the retracted position, the transfer unit 40 can move from the second inside position to the second outside position. When the transfer unit 40 moves from the second inside position to the second outside position, the transfer unit 40 passes below the fixing apparatus 80.

The fixing apparatus 80 includes a fixing frame 80*a*, which supports the fixing portion 81. When the fixing apparatus 80 is retracted from the use position, the fixing frame 80*a* is displaced relative to the apparatus main body 1A while supporting the fixing portion 81.

To pull the tray unit 50 out of the apparatus main body 1A, the door 20 is first moved to the open position as shown in FIG. 2. In this embodiment, the door 20 can move to the open position and to the closed position with the fixing apparatus 80 located at the use position. Then, with the door 20 in the open position, the fixing apparatus 80 is moved from the use position to the retracted position so as to move to the outside of the first space as shown in FIG. 3.

In the printer 1 of this embodiment, the fixing apparatus 80 is movable between the use position and the retracted position retracted from the use position while attached to the apparatus main body 1A. In this embodiment, when the fixing apparatus 80 is at the retracted position, the entire fixing apparatus 80 is located outside the first space.

The fixing apparatus 80 is lifted from the use position and moved to the retracted position above the use position. In other words, the fixing apparatus 80 moves to the retracted position higher than the use position. As shown in FIG. 7, when the fixing apparatus 80 is at the retracted position, at least a part of the fixing apparatus 80 protrudes from the apparatus main body 1A toward the outside of the apparatus main body 1A. Furthermore, when the fixing apparatus 80 is at the retracted position, the position of at least a part of the fixing apparatus 80 is higher than the position of the upper cover portion 20*b* of the door 20 in the closed position. This allows the size of the printer 1 to be kept small in the vertical direction V while the fixing apparatus 80 is at the use position. Additionally, the fixing apparatus 80 can move to the retracted position, providing a space for the tray unit 50 to move. While the fixing apparatus 80 is at the retracted position, the door 20 is restricted from assuming the closed position.

Specifically, the printer 1 includes a coupling member (fixing coupling member, fixing link, arm) 85 movably coupled to the apparatus main body 1A. The coupling member 85 couples the fixing apparatus 80 to the apparatus main body 1A.

The coupling member 85 is rotatable about a rotation center 85A, and when the tray unit 50 is pulled out of the apparatus main body 1A, the coupling member 85 moves out of the first space. The fixing apparatus 80 is rotatably connected to one end of the coupling member 85, and the other end of the coupling member 85 is connected to the apparatus main body 1A in a manner that allows rotation about the rotation center 85A. The fixing apparatus 80, while supported by the coupling member 85 (coupled to the apparatus main body 1A via the coupling member 85), is movable from the use position to the retracted position and from the retracted position to the use position. The coupling member 85 is configured to be movable (swingable) relative to the apparatus main body 1A and the fixing apparatus 80. That is, the fixing apparatus 80 is connected to the apparatus main body 1A through the coupling member 85. This increases the amount of movement of the fixing apparatus 80 when it moves between the retracted position and the use position, as compared with a configuration in which the fixing apparatus 80 is directly connected to the apparatus main body 1A.

As shown in FIG. 7, when the tray unit 50 moves from the first inside position to the first outside position, the angle between the moving direction of the tray unit 50 and the horizontal direction H is smaller than the angle between the moving direction of the tray unit 50 and the vertical direction V. Also, when the fixing apparatus 80 moves from the use position to the retracted position, the movement amount of the fixing apparatus 80 in the vertical direction V is greater than the movement amount of the fixing apparatus 80 in the horizontal direction H. In other words, when the fixing apparatus 80 moves from the use position to the retracted position, the amount of movement of the fixing apparatus 80 in a direction perpendicular to the moving direction of the tray unit 50 is greater than the amount of movement of the fixing apparatus 80 in a direction parallel to the moving direction of the tray unit 50.

Furthermore, the fixing apparatus 80 may be movable between the use position and the retracted position while attached to the apparatus main body 1A through a guide fixed to the apparatus main body 1A. In this case, the guide may have any shape.

However, the method for moving the fixing apparatus 80 to the outside of the first space is not limited to this. For example, the fixing apparatus 80 may be moved to the outside of the first space by being configured to be removal from the apparatus main body 1A so as to be retracted from the use position. In other words, by separating the fixing apparatus 80 from the apparatus main body 1A and the door 20 (separating it from the main frame 100), the fixing apparatus 80 may be positioned outside the first space. Also, the fixing apparatus 80 may be coupled to the door 20, and the fixing apparatus 80 may be moved to the outside of the first space by opening the door 20.

Relationship Between Tray Unit and Transfer Unit

Referring to FIGS. 1 to 7, the relationship between the tray unit 50 and the transfer unit 40 is now described.

As shown in FIG. 3, with the fixing apparatus 80 positioned outside the first space, the user grasps the tray handle 52 and moves the tray unit 50 toward the outside of the apparatus main body 1A.

As shown in FIGS. 6 and 7, the position of the transfer unit 40 for performing an image forming operation on the sheet S has the following relationship with the first space.

That is, when an image forming operation is performed on the sheet S, the transfer unit 40 is at the second inside position. As shown in FIGS. 6 and 7, at least a part of the transfer unit 40 at the second inside position overlaps with the first space. In other words, when the transfer unit 40 is at the second inside position, at least a part of the transfer unit 40 is inside the first space.

In this embodiment, at least a part of the transfer unit 40 overlaps with the space through which the tray 51 passes when the tray unit 50 moves from the first inside position to the first outside position, but it may also be positioned so as to overlap with the space through which the cartridges P pass.

This allows the apparatus main body 1A to be smaller in size than in a configuration in which the transfer unit 40 at the second inside position is located outside the first space.

In the printer 1 of this embodiment, the part of the transfer unit 40 that overlaps with the first space is the cleaning portion 43, which houses the cleaning member 43A. However, other portions of the transfer unit 40 may overlap with the first space. In this embodiment, the cleaning member 43A of the transfer unit 40 located at the second inside position also overlaps with the first space.

It may be understood that the tray unit 50 and the transfer unit 40 satisfy the following relationship. When the tray unit 50 is at the first inside position and the transfer unit 40 is at the second inside position, in the moving direction in which the tray unit 50 moves from the first inside position to the first outside position, a part of the transfer unit 40 (cleaning portion 43) is downstream of the tray unit 50. Additionally, in the vertical direction V, the area (range) in which a part of the transfer unit 40 (cleaning portion 43) is located at least partially overlaps with the area (range) in which the tray unit 50 is located.

In this embodiment, when the door 20 is in the closed state, at least a part of the double-sided conveyance path 20*a* overlaps with the second space through which the transfer unit 40 passes when moving from the second inside position to the second outside position. That is, when the door 20 is in the closed state, at least a part of the double-sided conveyance path 20*a* is inside the second space.

As described above, when the transfer unit 40 is at the second inside position, at least a part of the transfer unit 40 is inside the first space. As such, in this embodiment, when the user moves the tray unit 50 from the first inside position to the first outside position relative to the apparatus main body 1A, the transfer unit 40 also moves from the second inside position to the second outside position relative to the apparatus main body 1A. That is, in a state in which the transfer unit 40 and the tray unit 50 are integrated, the tray unit moves from the first inside position inside the apparatus main body to the first outside position outside the apparatus main body. At that time, the transfer unit 40 also moves from the second inside position inside the apparatus main body to the second outside position outside the apparatus main body.

Since the tray unit 50 and the transfer unit 40 move integrally, the photosensitive drums 61 are unlikely to be exposed when the tray unit 50 moves to the first outside position, reducing the likelihood that the photosensitive drums 61 are scratched or soiled.

As shown in FIG. 7, in a state in which the door 20 is open, the tray unit 50 is at the first outside position, and the transfer unit 40 is at the second outside position, the transfer unit 40 supports the tray unit 50 from below. Furthermore, in this embodiment, the door 20 supports the transfer unit 40. In other words, the transfer unit 40 supported by the door 20 supports the tray unit 50. In this state, it may be understood that the door 20 supports the tray unit 50 through the transfer unit 40.

Figure 8:
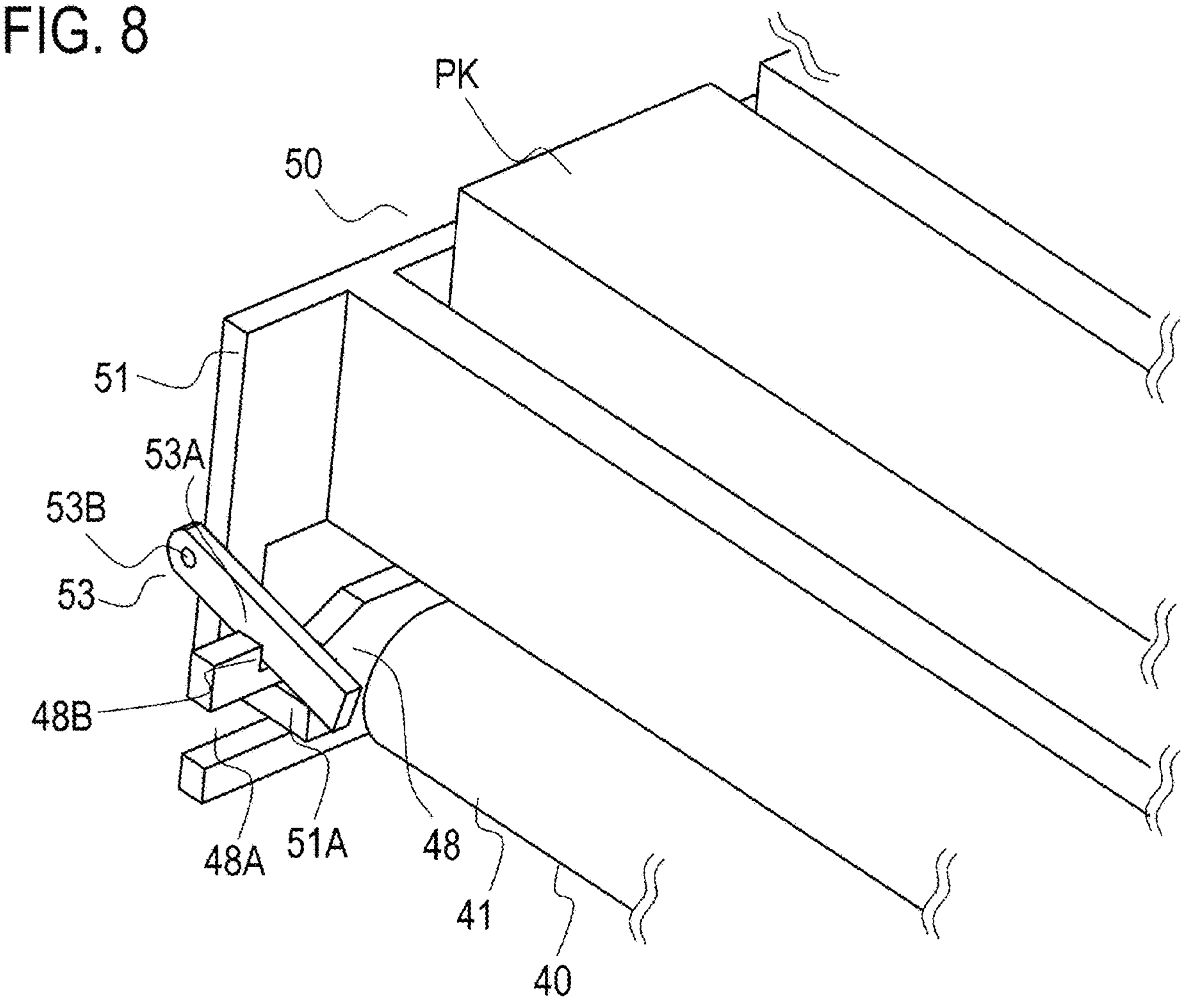
FIG. 8 is a diagram illustrating a coupling member coupling a tray of the tray unit and the transfer unit.
Figure 9:
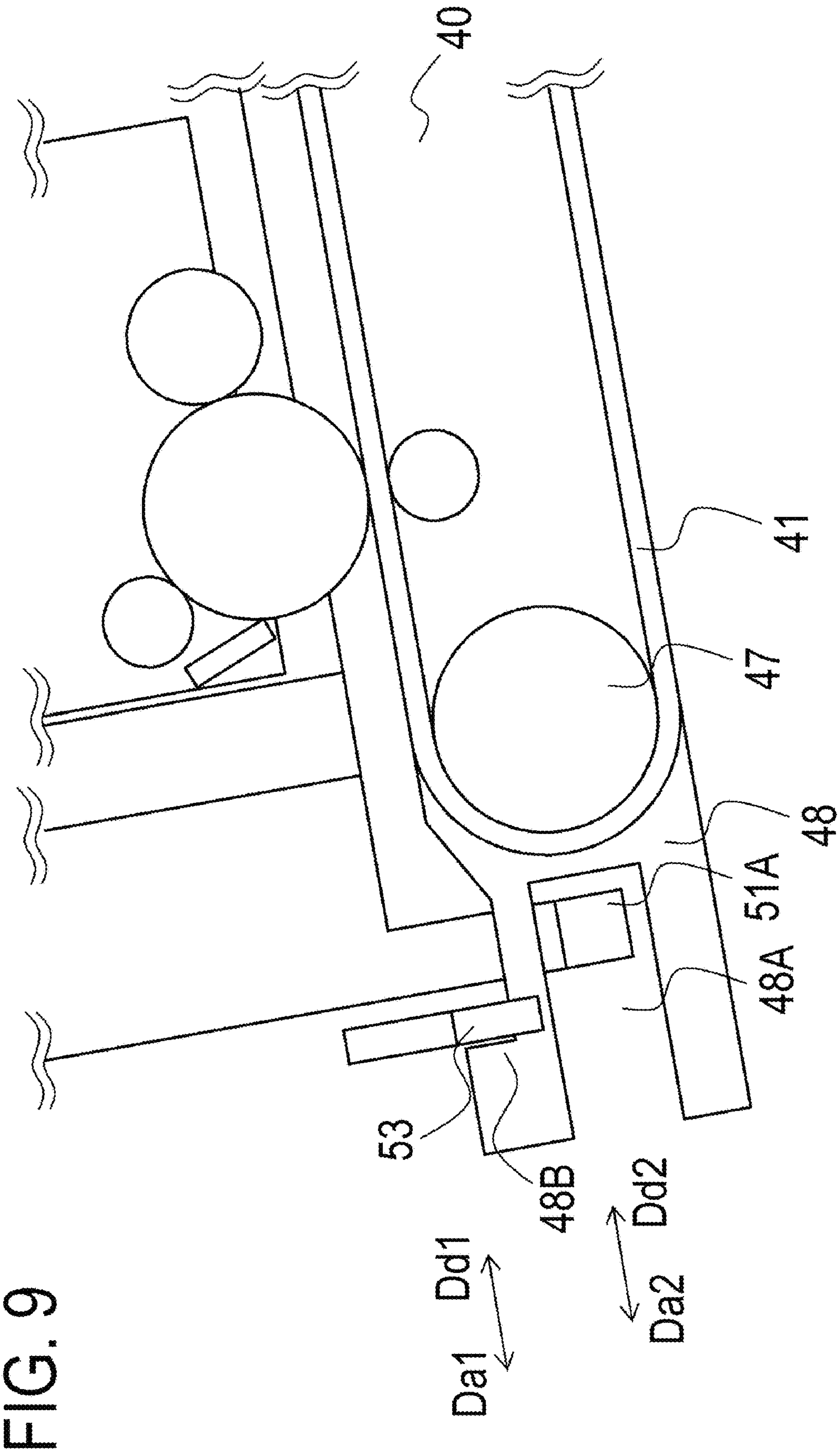
FIG. 9 is a diagram illustrating the coupling member coupling the tray of the tray unit and the transfer unit.
Figure 10:
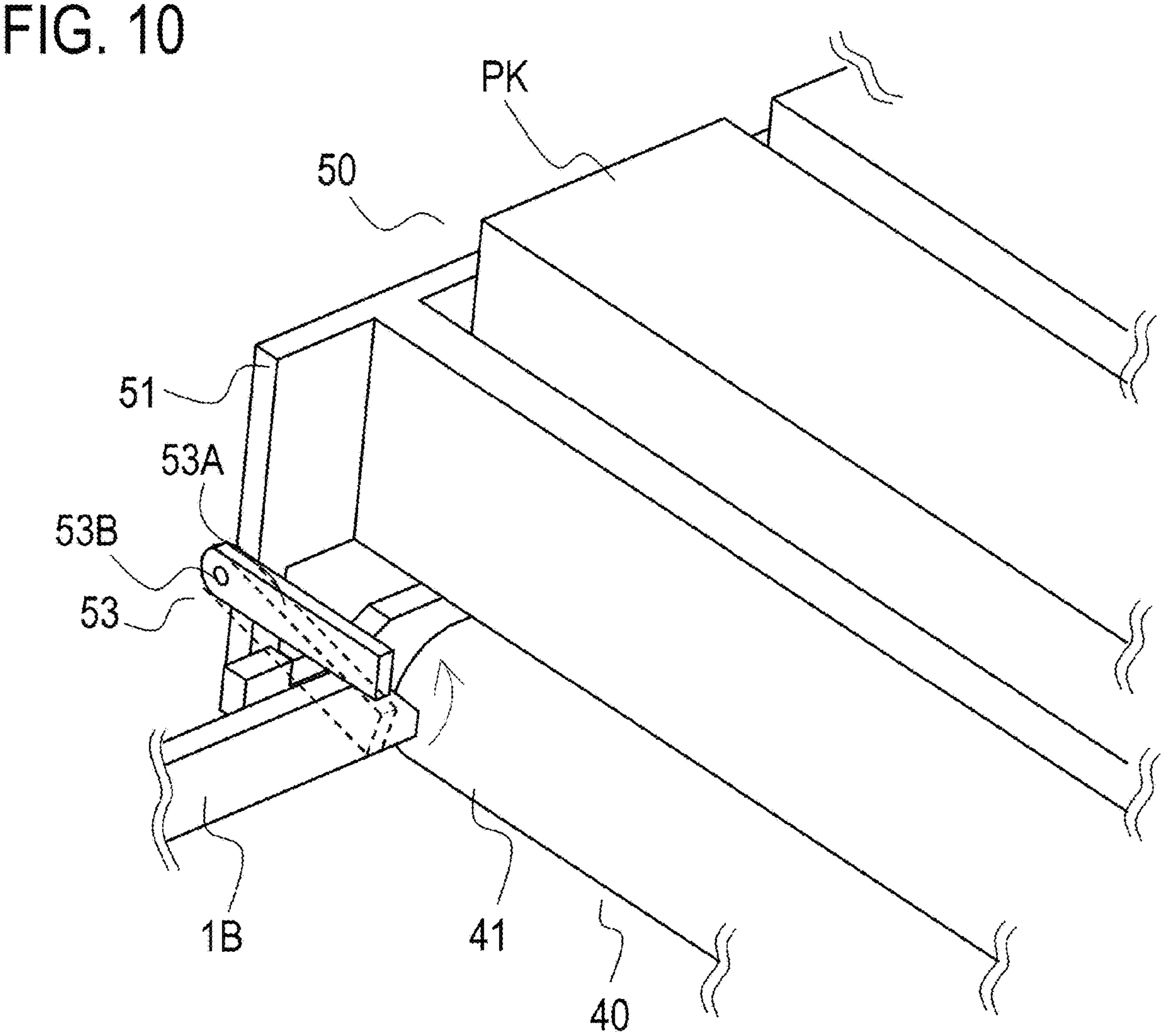
FIG. 10 is a diagram illustrating the coupling member coupling the tray of the tray unit and the transfer unit.

Referring to FIGS. 8, 9, and 10, the configuration for integrally moving the tray unit 50 and the transfer unit 40 is now described. FIGS. 8, 9, and 10 are diagrams for illustrating a coupling member (lever, stopper, lock member) 53, which couples the tray 51 of the tray unit 50 and the transfer unit 40.

The printer 1 according to this embodiment includes a lock member 53. In this embodiment, the lock member 53 is provided on the tray 51 of the tray unit 50. The lock member 53 includes a transfer lock portion 53A and is rotatable about a rotation center 53B.

The tray 51 includes a transfer coupling portion 51A. The transfer unit 40 includes a transfer frame 48, which supports the driver roller 46, the tension roller 47, and the primary transfer rollers 42. The transfer frame 48 includes a tray coupling groove 48A and a lock coupling portion 48B.

The lock member 53 rotates about the rotation center 53B, allowing the transfer lock portion 53A to engage with the lock coupling portion 48B. The lock member 53 can move to a coupling position for coupling the transfer unit 40 and the tray unit 50, and to a release position retracted from the coupling position.

The engagement of the transfer coupling portion 51A with the tray coupling groove 48A restricts the tray unit 50 from moving relative to the transfer unit 40 in the tray removal direction Dd1 and in a direction perpendicular to the tray removal direction Dd1. At the same time, the transfer unit 40 is restricted from moving relative to the tray unit 50 in the transfer attachment direction Da2 and in a direction perpendicular to the transfer attachment direction Da2.

Similar configurations are provided at four locations in total, near both end portions of the tension roller 47 in the rotation axis direction of the tension roller 47, and near both end portions of the driver roller 46 in the rotation axis direction of the driver roller 46.

When the transfer lock portion 53A of the lock member 53 in the coupling position engages with the lock coupling portion 48B, the tray unit 50 is restricted from moving in the tray attachment direction Da1 relative to the transfer unit 40. At the same time, the transfer unit 40 is restricted from moving in the transfer removal direction Dd2 relative to the tray unit 50.

The lock member 53 and the lock coupling portion 48B may also be provided at both end portions of the transfer unit 40 in the rotation axis direction of the tension roller 47.

In other words, in a state in which the transfer coupling portion 51A engages with the tray coupling groove 48A and the lock member 53 in the coupling position engages with the lock coupling portion 48B, the transfer unit 40 and the tray unit 50 are restricted from moving relative to each other. In this state, there may be some play between the transfer unit 40 and the tray unit 50.

That is, it may be understood that the transfer coupling portion 51A and the lock member 53 function as a tray-side coupling device, and the tray coupling groove 48A and the lock coupling portion 48B function as a transfer-side coupling device. The tray-side coupling device is coupled with the transfer-side coupling device, coupling the tray unit 50 and the transfer unit 40 to each other. The tray unit 50 and the transfer unit 40 therefore move integrally.

On the other hand, as shown in FIG. 10, the apparatus main body 1A has an unlock portion 1B. When the tray unit 50 is at the first inside position and the transfer unit 40 is at the second inside position, the lock member 53 is in contact with the unlock portion 1B and is in the release position. In this state, the transfer lock portion 53A is separated from the lock coupling portion 48B.

When the tray unit 50 is moved in the tray removal direction Dd1 with the lock member 53 in the release position, the transfer coupling portion 51A pushes the transfer unit 40 in the transfer removal direction Dd2. As a result, the transfer unit 40 is also moved integrally with the tray unit 50 in the transfer removal direction Dd2. When the tray unit 50 moves a predetermined distance in the tray removal direction Dd1, the lock member 53 is separated from the unlock portion 1B, moves to the coupling position, and engages with the lock coupling portion 48B. With the lock member 53 in the coupling position and engaged with the lock coupling portion 48B, the tray unit 50 is moved to the first outside position, and the transfer unit 40 is moved to the second outside position. That is, the tray unit 50 and the transfer unit 40 are coupled to each other and move integrally to the outside of the apparatus main body 1A.

When the tray unit 50 is moved in the tray attachment direction Da1 with the lock member 53 engaged with the lock coupling portion 48B, the lock member 53 pushes the transfer unit 40 in the transfer attachment direction Da2. As a result, the transfer unit 40 is also moved integrally with the tray unit 50 in the transfer attachment direction Da2.

When the transfer unit 40 is moved in the transfer attachment direction Da2 with the lock member 53 engaged with the lock coupling portion 48B, the transfer unit 40 pushes the transfer coupling portion 51A, pushing the tray unit 50 in the tray attachment direction Da1. As a result, the tray unit 50 is also moved integrally with the transfer unit 40 in the tray attachment direction Da1.

When the tray unit 50 and the transfer unit 40 are moved integrally toward the inside of the apparatus main body 1A, the unlock portion 1B moves the lock member 53 to the release position. In this state, even when the tray unit 50 is moved in the tray attachment direction Da1, the transfer unit 40 does not move. As such, in the process of closing the door 20, the force of the secondary transfer roller 45 coming into contact with the transfer unit 40 pushes the transfer unit 40 in the transfer attachment direction Da2 and into the rear side of the apparatus main body 1A (the second inside position). That is, the door 20 can push the transfer unit 40 so as to place the transfer unit 40 at the second inside position. Additionally, the door 20 may push the tray unit 50 so as to place the tray unit 50 at the first inside position.

On the other hand, in a state in which the lock member 53 is in the release position and the tray unit 50 is at the first inside position, the transfer unit 40 may be moved in the transfer removal direction Dd2. The transfer unit 40 is movable from the second inside position to the second outside position independently of the tray unit 50. With the printer 1 of this embodiment, as shown in FIG. 5, the transfer unit 40 can be moved to the outside of the apparatus main body 1A (second outside position) with the tray unit 50 remaining inside the apparatus main body 1A (first inside position). The transfer unit 40 is removable from the apparatus main body 1A, and can be replaced with a new transfer unit 40.

In this embodiment, while the tray unit 50 is at the first inside position, the tray unit 50 is positioned relative to the apparatus main body 1A independently of the transfer unit 40. Also, while the transfer unit 40 is at the second inside position, the transfer unit 40 is positioned relative to the apparatus main body 1A independently of the tray unit 50. This is because priority is given to accurately positioning the transfer unit 40 and the tray unit 50 relative to the apparatus main body 1A. As such, while the tray unit 50 is at the first inside position and the transfer unit 40 is at the second inside position, a slight clearance is provided between the tray coupling groove 48A and the transfer coupling portion 51A.

The clearance between the tray coupling groove 48A and the transfer coupling portion 51A may be eliminated so that the tray unit 50 and the transfer unit 40 can be positioned relative to each other while the tray unit 50 is at the first inside position and the transfer unit 40 is at the second inside position. In this case, the transfer unit 40 and the tray unit 50 can be positioned with high accuracy relative to each other.

Movement of Tray Unit and Transfer Unit

As shown in FIGS. 1, 6, and 7, the tray unit 50 and the transfer unit 40 are inclined with respect to the horizontal direction H while they are attached to the apparatus main body 1A.

More specifically, when the tray unit 50 is at the first inside position, the rotation axis of a photosensitive drum 61 closer to the first end portion 1*b*1 is located higher in the vertical direction V than the rotation axis of a photosensitive drum 61 farther from the first end portion 1*b*1.

In other words, when the tray unit 50 is at the first inside position, the second photosensitive drum is closer to the first end portion 1*b*1 than the first photosensitive drum, and the rotation axis of the second photosensitive drum is located higher in the vertical direction V than the rotation axis of the first photosensitive drum. Likewise, the third photosensitive drum is closer to the first end portion 1*b*1 than the second photosensitive drum, and the rotation axis of the third photosensitive drum is located higher in the vertical direction V than the rotation axis of the second photosensitive drum. The fourth photosensitive drum is closer to the first end portion 1*b*1 than the third photosensitive drum, and the rotation axis of the fourth photosensitive drum is located higher in the vertical direction V than the rotation axis of the third photosensitive drum.

Here, a straight line connecting the centers of the photosensitive drums 61 is defined as straight line LD. In this embodiment, when the tray unit 50 is at the first inside position, the straight line LD is inclined upward with respect to the horizontal direction H from the side farther from the first end portion 1*b*1 toward the side closer to the first end portion 1*b*1.

Furthermore, the contact surface of the belt 41 that comes into contact with the first, second, third, and fourth photosensitive drums is inclined upward from the side farther from the first end portion 1*b*1 toward the side closer to the first end portion 1*b*1.

When the tray unit 50 moves from the first inside position to the first outside position, the tray unit 50 moves in a direction inclined with respect to the horizontal direction H (in this embodiment, a direction inclined upward with respect to the horizontal direction H). That is, when the tray unit 50 moves from the first inside position to the first outside position, the tray unit 50 moves obliquely upward.

When the tray unit 50 moves from the first inside position to the first outside position, the moving direction of the tray unit 50 changes such that the tray unit 50 moves diagonally upward and then downward. The moving direction of the tray unit 50 may include a direction parallel to the horizontal direction H or a direction inclined downward with respect to the horizontal direction H.

The angle between the straight line LD and the horizontal direction H is smaller when the tray unit 50 is at the first outside position than when the tray unit 50 is at the first inside position. In this embodiment, when the tray unit 50 is at the first outside position, the straight line LD and the horizontal direction H are parallel to each other. However, the straight line LD may be inclined upward or downward with respect to the horizontal direction H.

Similarly, when the transfer unit 40 moves from the second inside position to the second outside position, the moving direction of the transfer unit 40 also changes such that the transfer unit 40 moves diagonally upward and then downward. The moving direction of the transfer unit 40 may include a direction parallel to the horizontal direction H or a direction inclined downward with respect to the horizontal direction H.

The angle between the contact surface of the belt 41 and the horizontal direction H is smaller when the transfer unit 40 is at the second outside position than when the transfer unit 40 is at the second inside position. In this embodiment, when the transfer unit 40 is at the second outside position, the contact surface of the belt 41 is parallel to the horizontal direction H, but the contact surface of the belt 41 may be inclined downward or upward with respect to the horizontal direction H.

When the tray unit 50 is moved from the first outside position to the first inside position, the tray unit 50 moves in the horizontal direction H and then moves diagonally downward from an intermediate point. When the transfer unit 40 is moved from the second outside position to the second inside position, the transfer unit 40 moves in the horizontal direction H and then moves diagonally downward from an intermediate point. According to this configuration, the weight of the tray unit 50 and the transfer unit 40 can be used when they are inserted into the apparatus main body 1A.

Positional Relationship Between Tray Unit Side Walls and Belt Side Edges

Figure 11A:
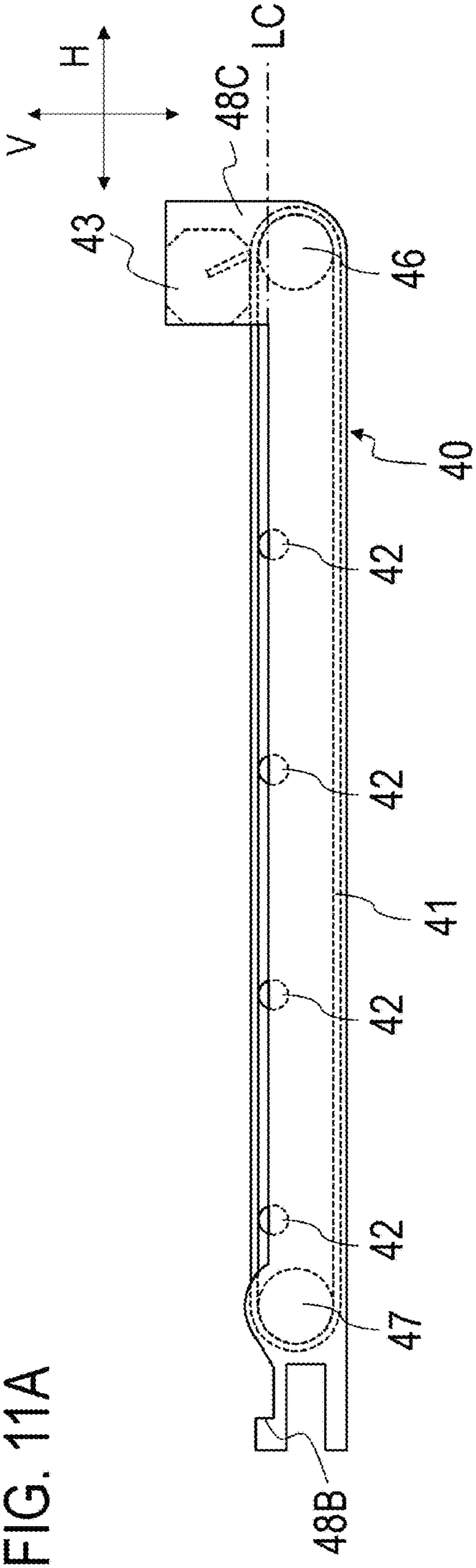
FIGS. 11A and 11B are side views of the transfer unit and the tray unit of the first embodiment in a state in which they are pulled out.
Figure 11B:
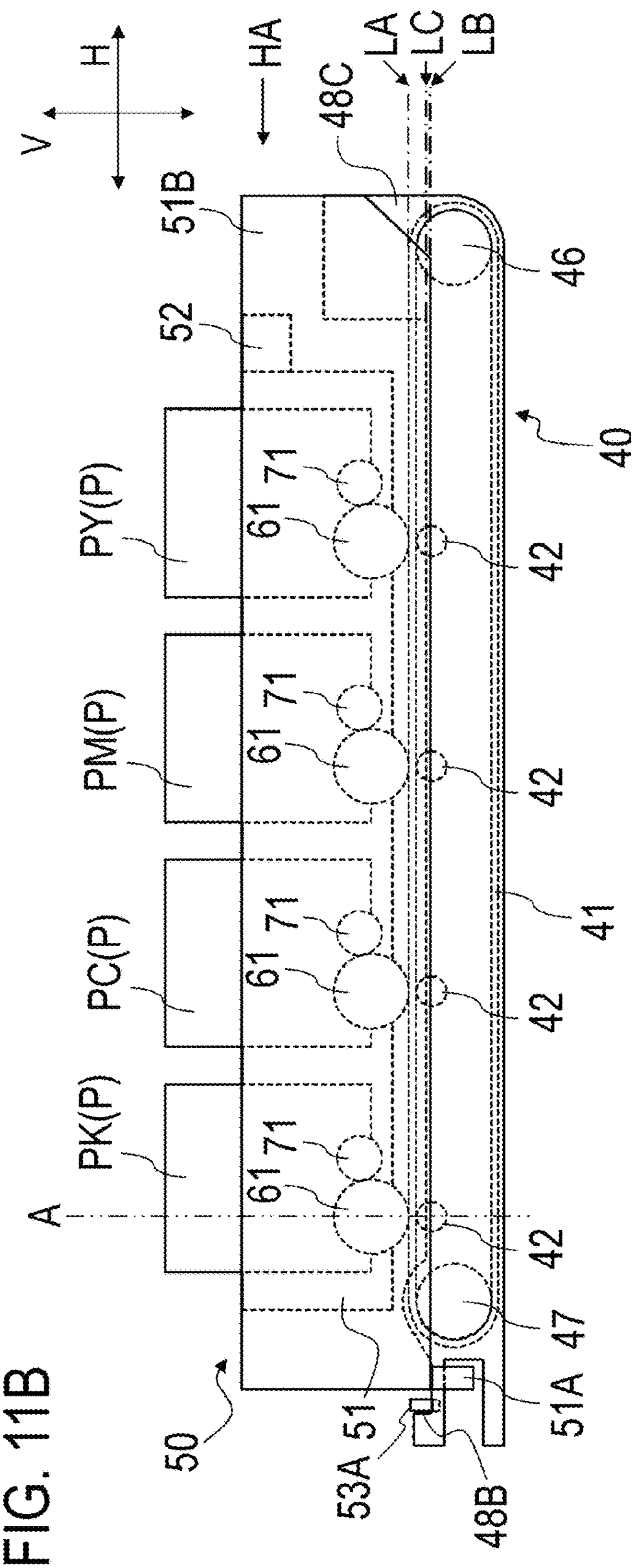
Figure 12:
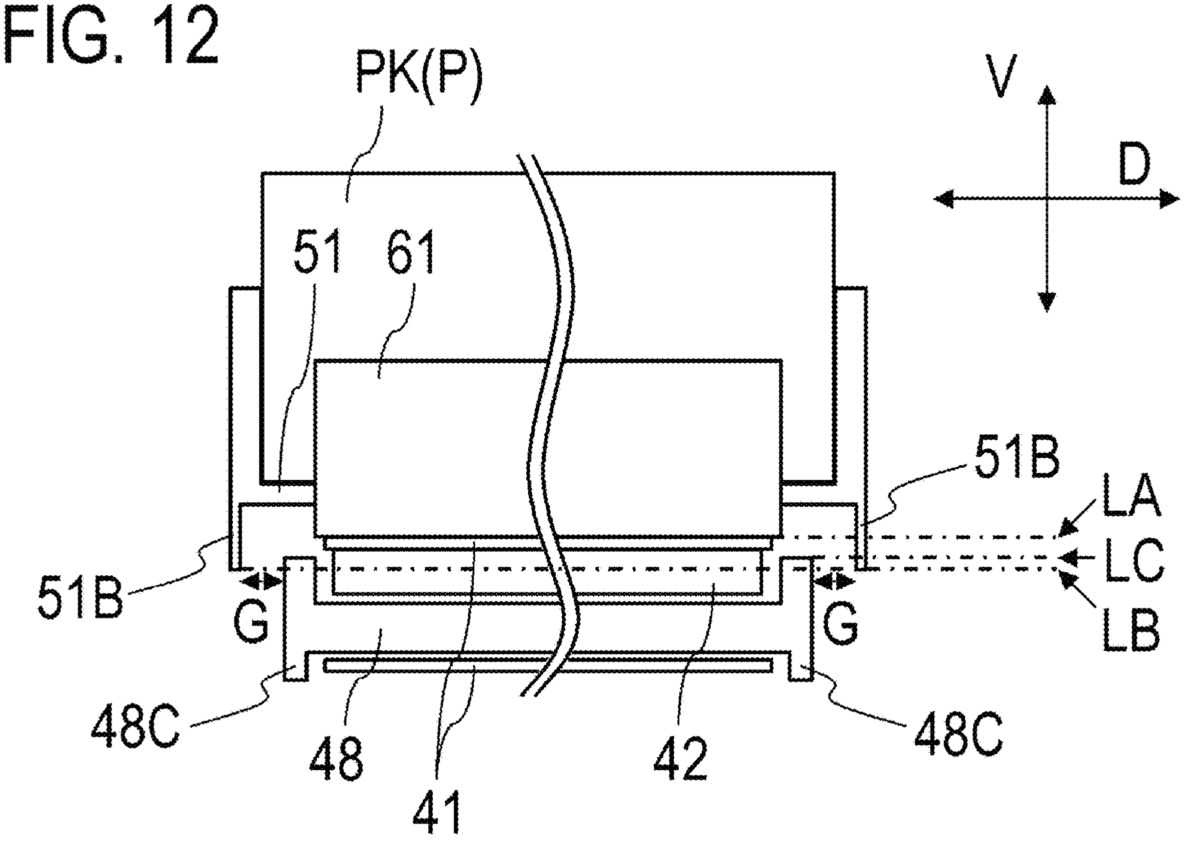
FIG. 12 is a cross-sectional view of the transfer unit and the tray unit of the first embodiment in a state in which they are pulled out.

Referring to FIGS. 11A, 11B, and 12, the positional relationship between the tray unit side walls and the belt side edges is now described.

FIG. 11A is a side view of the transfer unit 40 at the second outside position. Here, the side view refers to a view seen from a direction perpendicular to the horizontal direction H and the vertical direction V (hereinafter referred to as a left-right direction D), and is a view of the transfer unit 40 as seen directly from its side. The left-right direction D is parallel to the rotation axis direction of the photosensitive drums 61. In FIG. 11A, to show the relative locations of the components, dotted lines represent the shapes of some components that cannot be seen. This manner of illustration is also applied to the figures for the following embodiments. The transfer unit 40 includes transfer frame side walls 48C as second wall surfaces. Hereinafter, the section of the upper end portion of each transfer frame side wall 48C that is in the region in which the primary transfer rollers 42 are located in the direction in which the belt 41 moves while in contact with the photosensitive drums 61 is simply referred to as the upper end portion of the transfer frame side wall 48C. In FIG. 11A, dashed dotted line LC indicates the position of the upper end portion of the transfer frame side wall 48C. A part of each side edge portion of the belt 41 is located above the upper end portion of the corresponding transfer frame side wall 48C. A part of the side edge portion of the belt 41 is exposed from the transfer frame side wall 48C. The section of the side edge portion of the belt 41 that is located above the upper end portion of the transfer frame side wall 48C is hereinafter referred to as an upper side edge portion.

FIG. 11B is a side view of the tray unit 50 and the transfer unit 40 in a state in which they are integrated together and located at the first outside position and the second outside position, respectively. As shown in FIG. 11B, the tray unit 50 includes tray side walls 51B as first wall surfaces. More specifically, the tray 51 includes the tray side walls 51B. The tray side walls 51B are provided on both end sides of the tray unit 50 in the rotation axis direction of the photosensitive drums 61 (one end portion and the other end portion of the tray unit 50). The tray side walls 51B are placed so as to overlap with parts of the multiple primary transfer rollers 42 and cover the side surfaces of the transfer unit 40. Here, dashed dotted line LA indicates the contact position between the belt 41 and the photosensitive drums 61 in the vertical direction V (the position of the contact surface (first tension surface) where the belt 41 comes into contact with the photosensitive drums 61). Dashed dotted line LB indicates the position of the lower end portions of the tray side walls 51B. In this embodiment, in a state in which the tray unit 50 and the transfer unit 40 are coupled to each other, the dashed dotted line LB is located below the dashed dotted line LA in the vertical direction V. That is, the position of the lower end portions of the tray side walls 51B is located below the position of the contact surface where the belt 41 comes into contact with the photosensitive drums 61.

Furthermore, the position of the lower end portions of the tray side walls 51B is located below the upper end portions of the transfer frame side walls 48C. Here, the direction in which the belt 41 moves while in contact with the photosensitive drums 61 is referred to as a belt moving direction. In the region in which the primary transfer rollers 42 are located in the belt moving direction, the position of the upper end portions of the transfer frame side walls 48C is higher than the position of the lower end portions of the tray side walls 51B.

FIG. 12 is a cross-sectional view of the tray unit 50 and the transfer unit 40 in the integrated state in FIG. 11B taken along dashed double-dotted line A, and shows the positional relationship of the components in the left-right direction D. FIG. 12 is a cross-sectional view seen from the direction of arrow HA in the horizontal direction H in FIG. 11B, and shows an enlarged view of both ends. In the left-right direction D, the tray side walls 51B are positioned outward of the belt 41. In the vertical direction V, the tray side walls 51B are positioned such that the position of their lower ends (dashed dotted line LB), which are the lower end portions of the tray side walls 51B, is below the position of the belt surface (contact surface) (dashed dotted line LA). At this time, the lower end portions of the primary transfer rollers 42 are located below the lower end portions of the tray side walls 51B. Arranging the tray side walls 51B in this manner can protect the upper side edge portions of the belt 41.

In the side edge portions of the belt 41, the sections located below the dashed dotted line LC are hereinafter referred to as lower side edge portions. In this embodiment, as shown in FIGS. 11A, 11B, and 12, the lower side edge portions of the belt 41 are covered and thus protected by the transfer frame side walls 48C, which are the second wall surfaces. In the left-right direction D, the transfer frame side walls 48C are placed on both end sides of the belt 41 and at the outer sides of the belt 41. In the vertical direction V, the upper end portions of the transfer frame side walls 48C are located below the contact surface of the belt 41, and the lower end portions of the transfer frame side walls 48C are located below the opposite surface of the belt 41 opposite the contact surface.

As described above, according to the present embodiment, the tray side walls 51B can protect the upper side edge portions of the belt 41. This limits contact with the belt side edge portions of the transfer unit 40, which moves integrally with the tray unit 50, and intrusion of foreign matter, such as dust, into the transfer unit 40 from the belt side edge portions when the user pulls out the tray unit 50 to replace a cartridge, for example. As a result, the belt 41 is less likely to be soiled or damaged.

First Modification

The position of the upper end portions of the transfer frame side walls 48C (dashed dotted line LC) may be above the contact position between the belt 41 and the photosensitive drums 61 (dashed dotted line LA).

Figure 13:
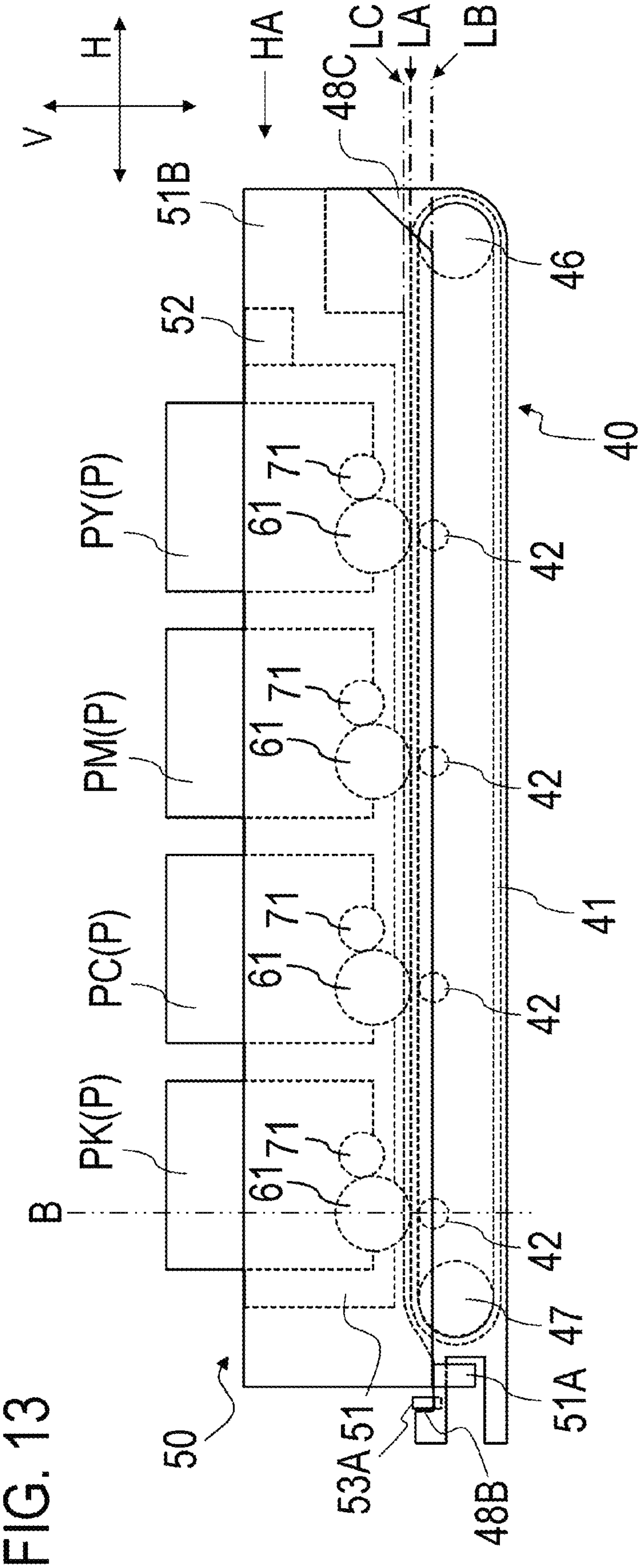
FIG. 13 is a side view of a transfer unit and a tray unit of a first modification in a state in which they are pulled out.

FIG. 13 is a side view of a first modification of the present embodiment showing a state after the tray unit 50 and the transfer unit 40 are integrated and moved to the first outside position and the second outside position of the apparatus main body 1A. The position of the upper end portions of the transfer frame side walls 48C, indicated by the dashed dotted line LC, is located above the contact position between the belt 41 and the photosensitive drums 61, which is indicated by the dashed dotted line LA, in the vertical direction V. That is, the upper end portions of the transfer frame side walls 48C are located above the contact surface where the belt 41 comes into contact with the photosensitive drums 61.

Figure 14:
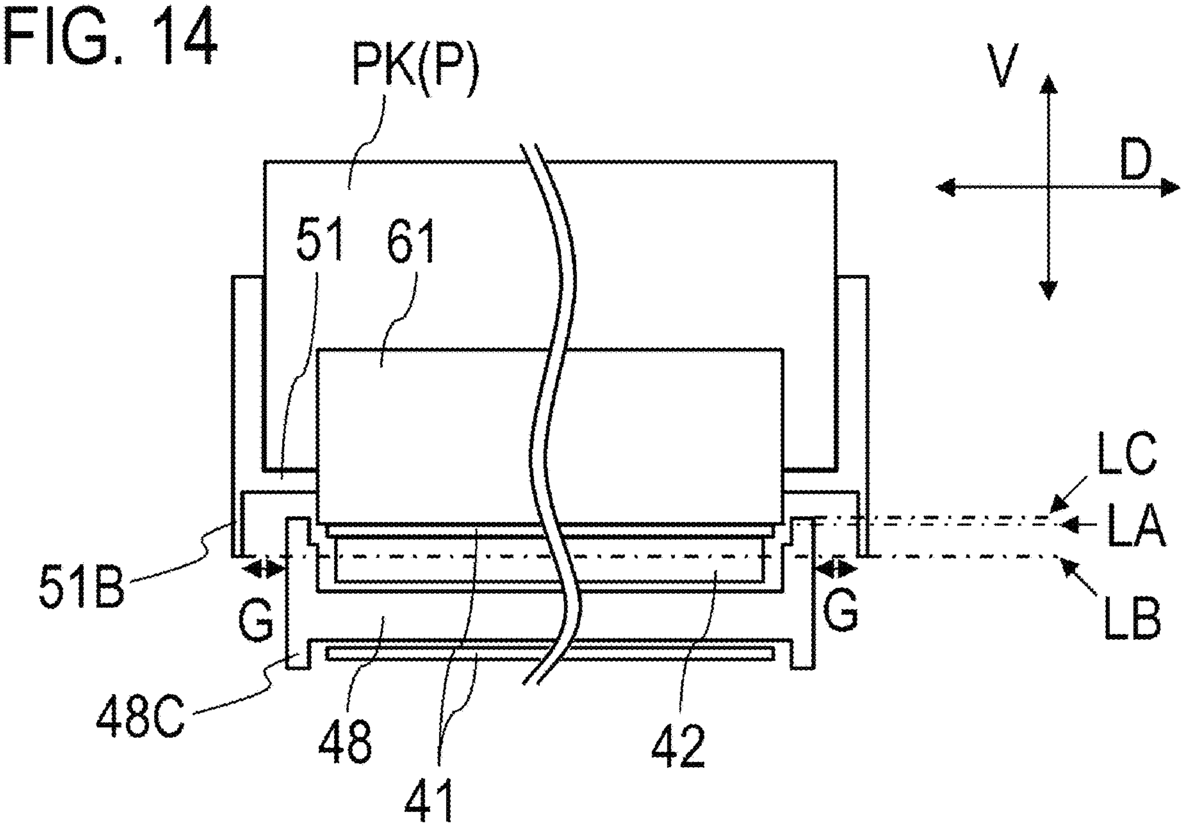
FIG. 14 is a cross-sectional view of the transfer unit and the tray unit of the first modification in a state in which they are pulled out.

FIG. 14 is a cross-sectional view taken along dashed double-dotted line B in FIG. 13, seen from the direction of arrow HA, with both ends enlarged. In the left-right direction D, the transfer frame side walls 48C are located inward of the tray side walls 51B. In the vertical direction V, the position of the upper end portions of the transfer frame side walls 48C (dashed dotted line LC) is above the contact position between the belt 41 and the photosensitive drums 61 (dashed dotted line LA). The position of the lower end portions of the tray side walls 51B (dashed dotted line LB) is below the contact position between the belt 41 and the photosensitive drums 61 (dashed dotted line LA). In other words, the side edge portions of the belt 41 are protected by being doubly covered by the transfer frame side walls 48C and the tray side walls 51B at the outer portions in the left-right direction D.

As shown in FIG. 14, small gaps G may be created between the tray side walls 51B and the transfer frame side walls 48C. Thus, there is a possibility that foreign matter such as dust may enter through the gaps G, and this foreign matter may further enter the inside of the transfer unit 40 from the upper side edge portions of the transfer unit 40. However, in this modification, the side edge portions of the belt 41 are doubly protected by the transfer frame side walls 48C and the tray side walls 51B. This effectively limits intrusion of foreign matter from the upper side edge portions of the transfer unit 40 even if the gaps G are created between the transfer frame side walls 48C and the tray side walls 51B.

Second Modification

Additionally, the tray side walls 51B may be extended downward in the vertical direction V to protect the lower side edge portions of the belt 41.

Figure 15A:
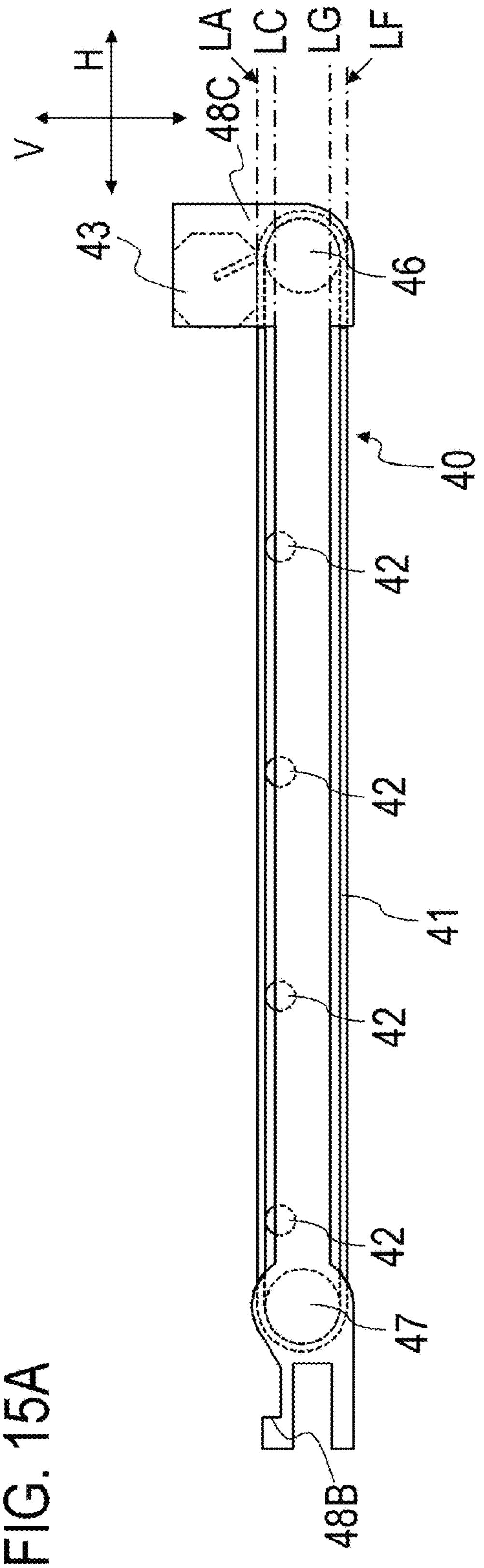
FIGS. 15A and 15B are side views of a transfer unit and a tray unit of a second modification in a state in which they are pulled out.

FIG. 15A is a side view of the transfer unit 40 of a second modification of the present embodiment at the second outside position. Here, dashed dotted line LF indicates the position of the lower side edge portions of the belt 41 in the vertical direction V, and dashed dotted line LG indicates the position of the lower end portions of the transfer frame side walls 48C. As in this modification, the upper and lower side edge portions of the belt 41 may be exposed from the transfer frame side walls 48C. That is, the side edge portions of the belt 41 may include a section above the dashed dotted line LC and a section below the dashed dotted line LG in the vertical direction V, and these sections may be exposed from the transfer frame side walls 48C.

Figure 15B:
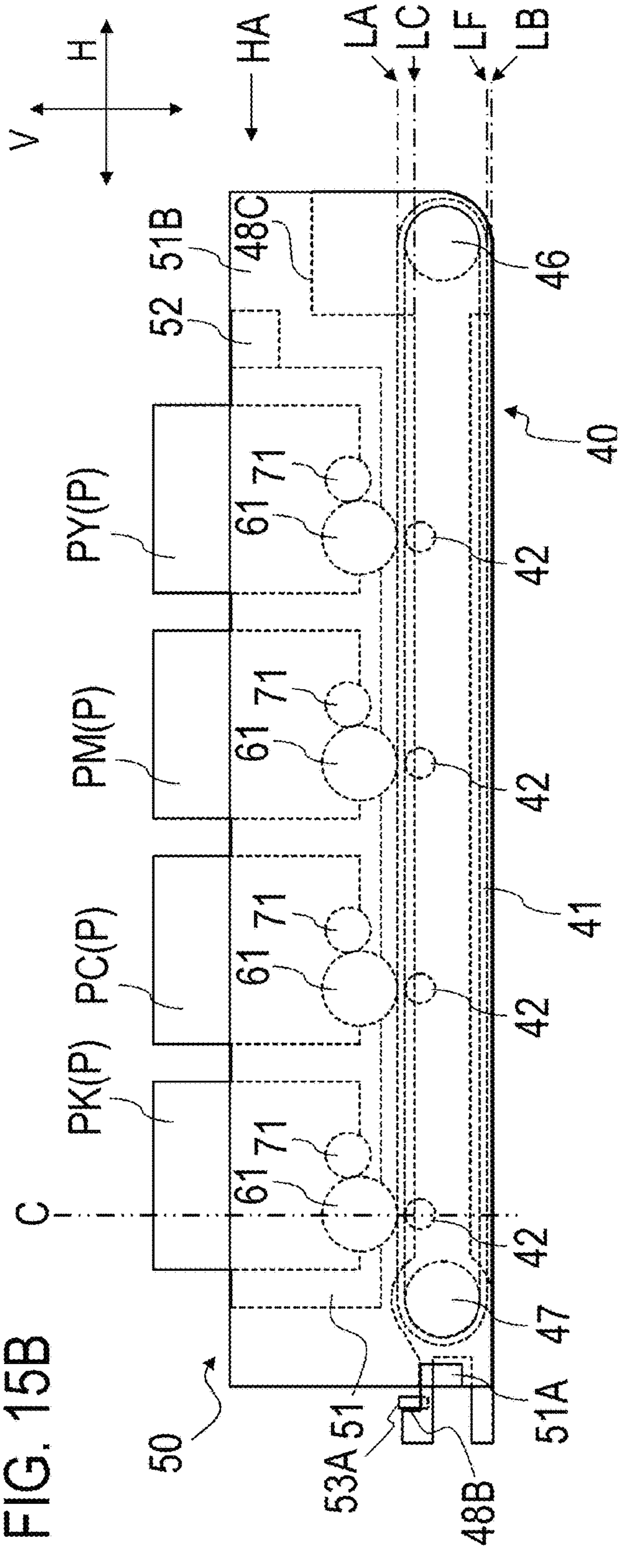

FIG. 15B is a side view of the tray unit 50 and the transfer unit 40 of the second modification of the present embodiment in a state in which they are integrated and located at the first outside position and the second outside position, respectively. As shown in FIG. 15B, the tray side walls 51B are placed so as to cover the upper and lower side edge portions of the belt 41 exposed from the transfer frame side walls 48C. That is, the tray side walls 51B are placed so as to cover the area in the vertical direction V from the contact surface of the belt 41 with the photosensitive drums 61 to the opposite surface opposite the contact surface. The position of the lower end portions of the tray side walls 51B indicated by the dashed dotted line LB is below the lower side edge portions of the belt 41 indicated by the dashed dotted line LF, and is below the opposite surface of the belt 41.

Figure 16:
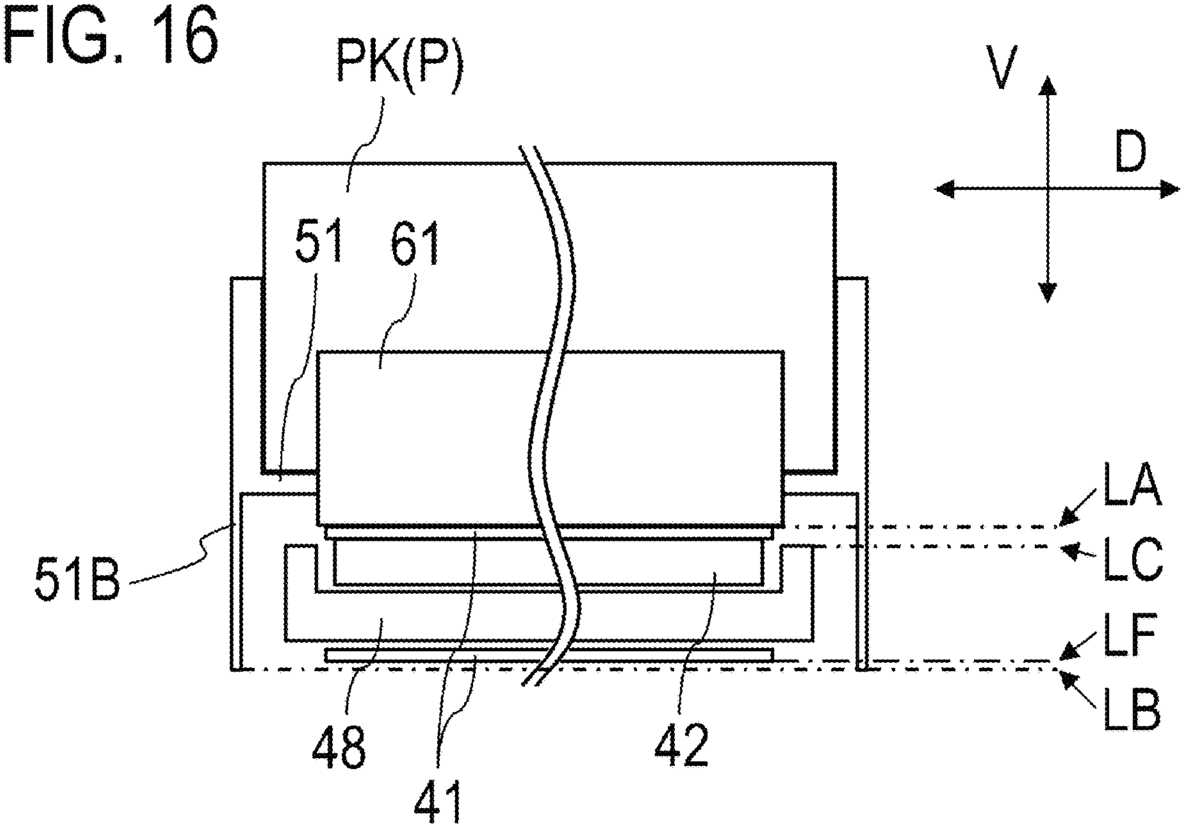
FIG. 16 is a cross-sectional view of the transfer unit and the tray unit of the second modification in a state in which they are pulled out.

FIG. 16 is a cross-sectional view of the tray unit 50 and the transfer unit 40 in the integrated state in FIG. 15B taken along dashed double-dotted line C, and shows the positional relationship of the components in the left-right direction D. The tray side walls 51B are placed outward of the belt 41 in the left-right direction D. Also, in the vertical direction V, the position of the lower end portions of the tray side walls 51B (dashed dotted line LB) is below the position of the lower side edge portions of the belt 41 (dashed dotted line LF). Arranging the tray side walls 51B in this manner achieves the protection of the side edge portions of the belt 41 only by the tray side walls 51B.

In this modification, as shown in FIG. 15A, when the transfer unit 40 is isolated, the side edge portions of the belt 41 are exposed from the transfer frame side walls 48C. However, by integrating the transfer unit 40 and the tray unit 50 as shown in FIGS. 15B and 16, the tray side walls 51B can protect the side edge portions of the belt 41.

In a configuration in which the tray unit 50 and the transfer unit 40 are integrated and moved to the outside of the apparatus main body 1A as in the present disclosure, gaps G may be created between the tray side walls 51B and the transfer frame side walls 48C as described above. This leads to a possibility that foreign matter entering through the gaps G may enter the inside of the transfer unit 40, causing image defects. To address this issue, in the configuration of the second modification, the tray side walls 51B are extended downward to protect the entire areas of the side edge portions of the transfer unit 40, thereby limiting intrusion of foreign matter through the side edge portions of the transfer unit 40. This limits the occurrence of image defects caused by intrusion of foreign matter.

Third Modification

As described above, the photosensitive drums 61, the charging rollers 62, and the developing rollers 71 may be disposed in either the cartridges P or the tray 51. This is now described with reference to FIGS. 17A to 17D. FIGS. 17A to 17D are diagrams each showing a tray unit 50 according to a modification.

Figure 17B:
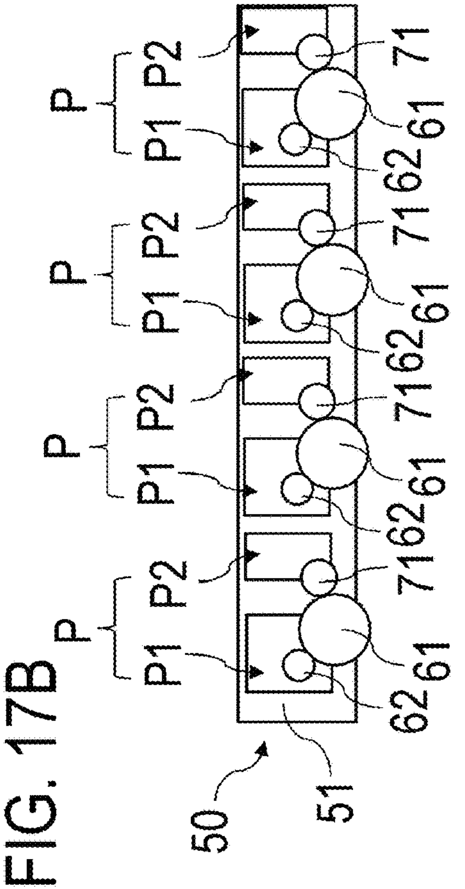
FIGS. 17A to 17D are explanatory diagrams of tray units of a third modification.
Figure 17D:
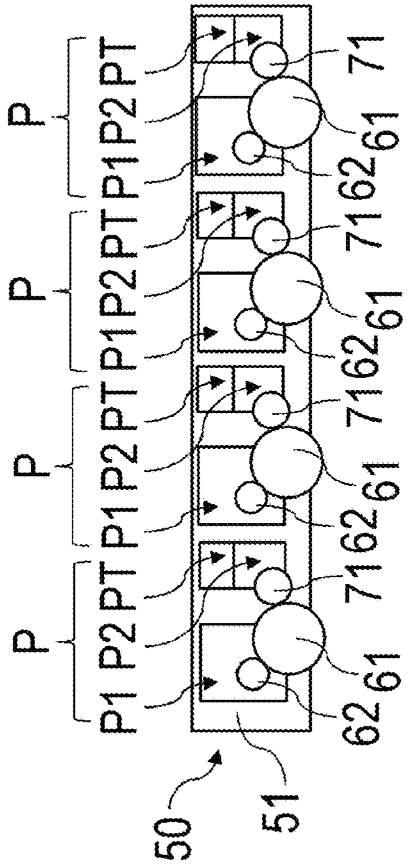
Figure 17A:
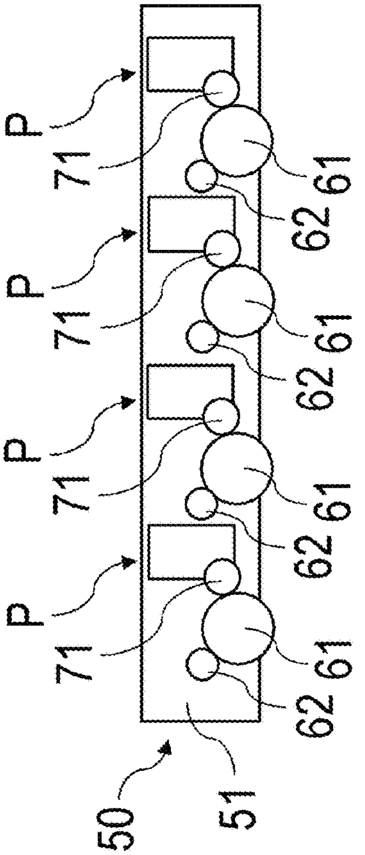

For example, as shown in FIG. 17A, the tray 51 may include photosensitive drums 61 and charging rollers 62, and the cartridges P may include developing rollers 71.

Here, a drum cartridge including a photosensitive drum 61 and a charging roller 62 is designated as P1, and a developing cartridge including a developing roller 71 is designated as P2. As shown in FIG. 17B, the cartridges P may include drum cartridges P1 and developing cartridges P2. That is, each cartridge P may be separable into a drum cartridge P1 and a developing cartridge P2. In this case, the drum cartridge P1 and the developing cartridge P2 are preferably attachable to and detachable from the tray 51 independently of each other.

Figure 17C:
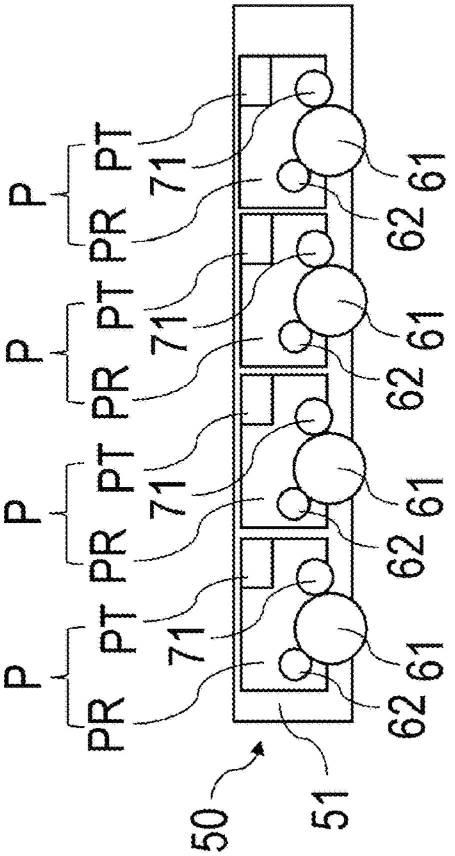

In FIG. 17C, a cartridge including a photosensitive drum 61, a charging roller 62, and a developing roller 71 is designated as PR, and a cartridge including toner for replenishing the cartridge PR is designated as PT. As shown in FIG. 17C, each cartridge P may include a cartridge PR and a cartridge PT. Furthermore, the cartridge P may be separable into a cartridge PR and a cartridge PT.

Furthermore, as shown in FIG. 17D, each cartridge P may include a drum cartridge P1, a developing cartridge P2, and a cartridge PT having toner for replenishing the developing cartridge P2. As in the case of FIG. 17C, the cartridge P may be separable into a drum cartridge P1, a developing cartridge P2, and a cartridge PT.

Second Embodiment

Another embodiment of an image forming apparatus according to the present disclosure is now described. The basic configuration and operation of the image forming apparatus of this embodiment are the same as those of the image forming apparatus of the first embodiment. Thus, elements having the same or corresponding functions and configurations as those of the image forming apparatus of the first embodiment are given the same reference numerals, and detailed explanations are omitted. The characteristic points of the present embodiment are described below.

This embodiment differs from the first embodiment in that each primary transfer roller 42 is movable between a contact position and a separated position. Specifically, in this embodiment, the position at which the primary transfer roller 42 presses the belt 41 to form a primary transfer portion, in which the photosensitive drum 61 and the belt 41 come into contact with each other, is defined as the contact position. The position at which the pressing by the primary transfer roller 42 against the belt 41 is released so as to separate the belt 41 from the photosensitive drum 61 is defined as the separated position. The primary transfer roller 42 in this embodiment moves between the contact position and the separated position described above. The apparatus main body 1A includes a switching device for switching between a state in which the primary transfer roller 42 is at the contact position and a state in which the primary transfer roller 42 is at the separated position. This allows the belt 41 to be separated from the photosensitive drum 61 while no image forming operation is performed.

In this embodiment, when the user moves the tray unit 50 and the transfer unit 40 in the integrated state from the inside to the outside the apparatus main body 1A to replace a cartridge P, for example, the primary transfer rollers 42 are at the separated position. The belt 41 is thus separated from the photosensitive drums 61. Even after moved to the outside, the primary transfer rollers 42 are at the separated position, and the belt 41 and the photosensitive drums 61 remain in the separated state. If the photosensitive drums 61 rub against the belt 41, the surfaces of the photosensitive drums 61 and the belt 41 may be scratched, or the surfaces of the photosensitive drums 61 may be triboelectrically charged, resulting in image defects. To limit scratching and image defects caused by the photosensitive drums 61 rubbing against the belt 41, the belt 41 and the photosensitive drums 61 are separated from each other in this embodiment.

When there is play between the tray unit 50 and the transfer unit 40 in the coupled state, the vibrations caused while they move to the outside of the apparatus main body 1A slightly move the tray unit 50 and the transfer unit 40 relative to each other. At this time, if the primary transfer rollers 42 are at the contact position, the belt 41 would be in contact with the photosensitive drums 61, resulting in friction between the photosensitive drums 61 and the belt 41. This may cause scratches on the surfaces of the photosensitive drums 61 and the belt 41, or the surface of the photosensitive drums 61 may be triboelectrically charged. If such effects are prominent, scratches caused by friction may cause image defects, or the triboelectrically charged section of each photosensitive drum 61 may become unevenly charged, causing strip-shaped image defects in accordance with the cycle of the photosensitive drum.

In this embodiment, to limit occurrence of such image defects, the primary transfer rollers 42 are moved to the separated position when the tray unit 50 and the transfer unit 40 are moved from the inside to the outside of the apparatus main body 1A in the integrated state.

Figure 18:
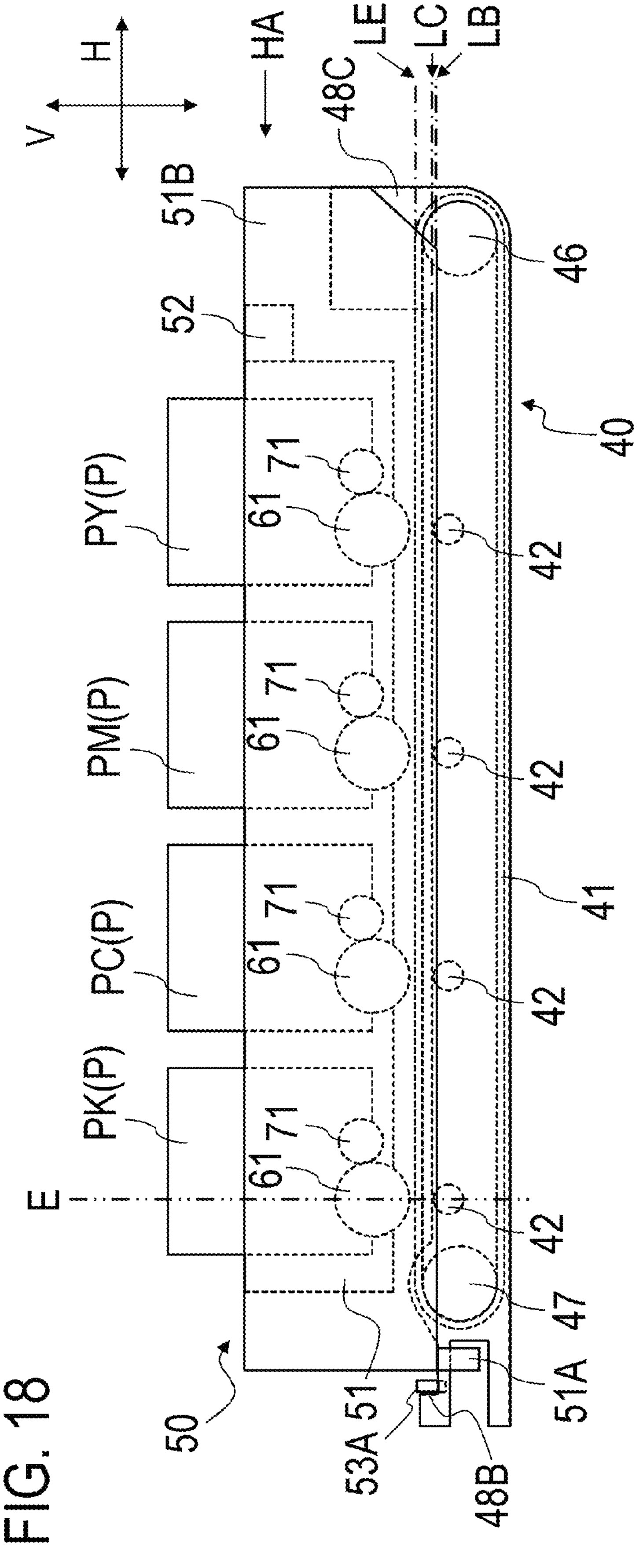
FIG. 18 is a side view of a transfer unit and a tray unit of a second embodiment in a state in which they are pulled out.

FIG. 18 is a side view of the present embodiment showing a state in which the primary transfer rollers 42 are at the separated position after the tray unit 50 and transfer unit 40 are integrated and moved to the first outside position and the second outside position of the apparatus main body 1A. Dashed dotted line LE indicates the position of the tension surface, which serves as a first tension surface, of the belt 41 stretched between the driver roller 46 and the tension roller 47. The position of the lower end portions of the tray side walls 51B (dashed dotted line LB) is below the position of this dashed dotted line LE in the vertical direction V. That is, even when the belt 41 is separated from the photosensitive drums 61, the lower end portions of the tray side walls 51B are placed below the contact surface of the belt 41.

Figure 19:
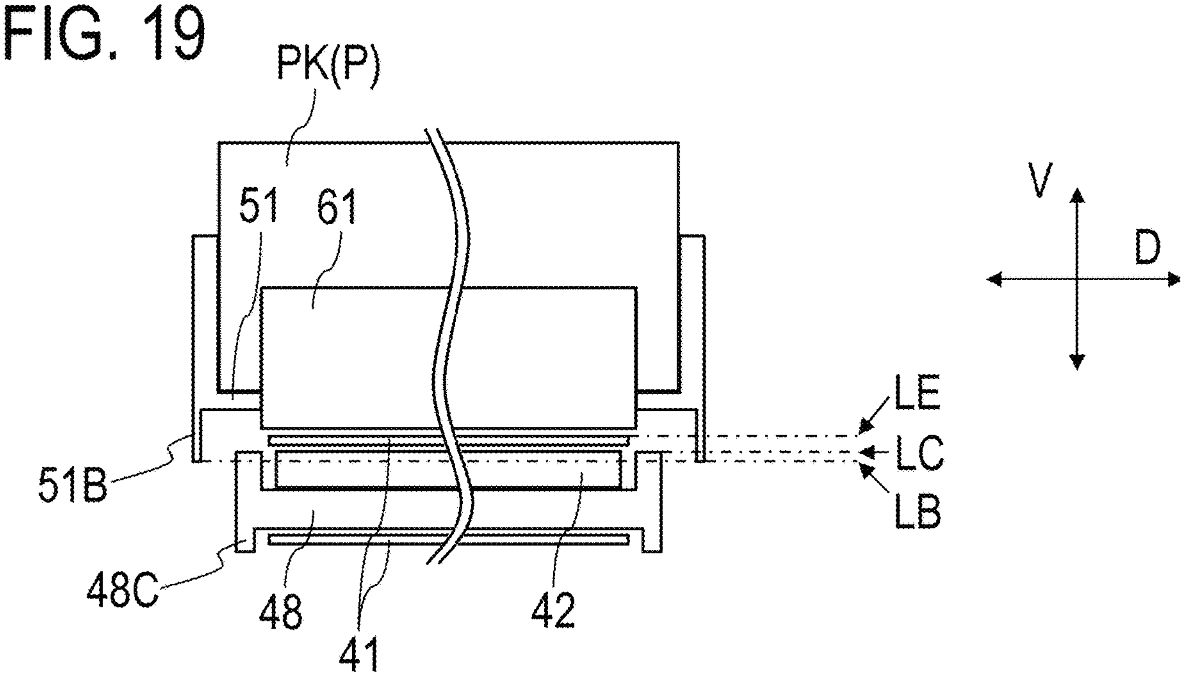
FIG. 19 is a cross-sectional view of the transfer unit and the tray unit of the second embodiment in a state in which they are pulled out.

FIG. 19 is a cross-sectional view of the tray unit 50 and the transfer unit 40 in the integrated state in FIG. 18, taken along dashed double-dotted line E and viewed from the direction of arrow HA, with both ends enlarged. In the left-right direction D, the tray side walls 51B are positioned outward of the belt 41. In the vertical direction V, the position of the lower end portion of the tray side walls 51B (dashed dotted line LB) is below the position of the tension surface of the belt 41 (dashed dotted line LE). In this embodiment, the upper side edge portions of the belt 41 are protected by arranging the tray side walls 51B in this manner.

As described above, according to this embodiment, even when the primary transfer rollers 42 are at the separated position, the tray side walls 51B can protect the upper side edge portions of the belt 41.

In the embodiments of the present disclosure described above, as shown in FIG. 4, in a state in which a part of the belt 41 is pulled out of the apparatus main body 1A, the tray side walls 51B or the transfer frame side walls 48C protect the entire side edge portions of the belt 41. However, the present embodiments are not limited to this. That is, the tray side walls 51B or the transfer frame side walls 48C may partially protect only the regions of the entire side edge portions of the belt 41 that are located outside the apparatus main body 1A.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-039053, filed on Mar. 13, 2024, which is hereby incorporated by reference herein in its entirety.

What is claimed is:

1. An image forming apparatus comprising:

an apparatus main body;

a first unit including a photosensitive drum, the first unit being movable between an inside and an outside of the apparatus main body and including a first wall surface provided at one end portion in a rotation axis direction of the photosensitive drum; and a second unit including a belt configured to contact with the photosensitive drum, the second unit being movable between the inside and the outside of the apparatus main body while the first unit is inside the apparatus main body, wherein the first unit and the second unit are movable to the outside of the apparatus main body in a state in which the first unit and the second unit are coupled to each other, and wherein in the state in which the first unit and the second unit are coupled to each other, the first wall surface is located outward of the belt in the rotation axis direction, and a lower end portion of the first wall surface in a vertical direction is located below a contact surface of the belt that comes into contact with the photosensitive drum.

2. The image forming apparatus according to claim 1, wherein the second unit further includes a primary transfer roller, and wherein in the state in which the first unit and the second unit are coupled to each other, the first wall surface overlaps with at least a part of the primary transfer roller as viewed in the rotation axis direction.

3. The image forming apparatus according to claim 2, wherein in the state in which the first unit and the second unit are coupled to each other, a lower end portion of the primary transfer roller in the vertical direction is located below the lower end portion of the first wall surface as viewed in the rotation axis direction.

4. The image forming apparatus according to claim 2, wherein the primary transfer roller is movable such that the belt is separated from the photosensitive drum, and wherein in a state in which the first unit and the second unit are coupled to each other and the belt is separated from the photosensitive drum, the lower end portion of the first wall surface is located below the contact surface.

5. The image forming apparatus according to claim 1, wherein the second unit has a second wall surface covering an end portion of the belt in the rotation axis direction, and wherein in the state in which the first unit and the second unit are coupled to each other, an upper end portion of the second wall surface in the vertical direction is located above the lower end portion of the first wall surface.

6. The image forming apparatus according to claim 5, wherein in the state in which the first unit and the second unit are coupled to each other, the second wall surface is located between the first wall surface and the belt in the rotation axis direction, and the upper end portion of the second wall surface in the vertical direction is located above the contact surface of the belt.

7. The image forming apparatus according to claim 5, wherein in the state in which the first unit and the second unit are coupled to each other, the upper end portion of the second wall surface in the vertical direction is located below the contact surface of the belt.

8. The image forming apparatus according to claim 5,
wherein the first wall surface is provided at each side of both ends of the photosensitive drum in the rotation axis direction, and
wherein the second wall surface is provided at each side of both ends of the belt in the rotation axis direction.

9. The image forming apparatus according to claim 1,
wherein the belt includes an opposite surface opposite the contact surface, and
wherein in the state in which the first unit and the second unit are coupled to each other, the lower end portion of the first wall surface is located below the opposite surface in the vertical direction.

10. The image forming apparatus according to claim 1,
wherein the first unit is a tray unit that includes a cartridge and a tray to which the cartridge is removably attached, and is movable between the inside and the outside of the apparatus main body, and
wherein the photosensitive drum is disposed in one of the cartridge or the tray.

11. The image forming apparatus according to claim 1, wherein when the first unit moves from the inside to the outside of the apparatus main body, the second unit also moves from the inside to the outside of the apparatus main body.

* * * * *